United States Patent
Kawamura et al.

(12)

(10) Patent No.: US 6,790,571 B2
(45) Date of Patent: Sep. 14, 2004

(54) AROMATIC POLYCARBONATE RESIN, ELECTROPHOTOGRAPHIC PHOTOCONDUCTOR, PROCESS CARTRIDGE, AND ELECTROPHOTOGRAPHIC IMAGE FORMING METHOD AND APPARATUS

(75) Inventors: Shinichi Kawamura, Shizuoka (JP); Masaomi Sasaki, Shizuoka (JP); Kazukiyo Nagai, Shizuoka (JP); Kohkoku Ri, Shizuoka (JP); Susumu Suzuka, Kanagawa (JP); Katsuhiro Morooka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/051,230

(22) Filed: Jan. 22, 2002

(65) Prior Publication Data

US 2002/0098430 A1 Jul. 25, 2002

Related U.S. Application Data

(63) Continuation of application No. 09/610,427, filed on Jul. 5, 2000, now abandoned.

(30) Foreign Application Priority Data

Jul. 6, 1999 (JP) .......................................... 11-191652
Jul. 6, 1999 (JP) .......................................... 11-191667

(51) Int. Cl.$^7$ ............................................... G03G 5/05
(52) U.S. Cl. ...................... 430/56; 430/59.6; 430/58.7; 399/159; 399/111
(58) Field of Search ........................ 430/56, 58.7, 59.6, 430/69; 399/159, 111

(56) References Cited

U.S. PATENT DOCUMENTS

| | | | | |
|---|---|---|---|---|
| 5,336,582 A | * | 8/1994 | Takegawa et al. | 430/58.7 |
| 5,356,743 A | * | 10/1994 | Yanus et al. | 430/58.7 |
| 5,409,792 A | * | 4/1995 | Yanus et al. | 430/58.7 |
| 5,486,439 A | * | 1/1996 | Sakakibara et al. | 430/58.7 |
| 5,840,454 A | | 11/1998 | Nagai et al. | |
| 5,871,876 A | * | 2/1999 | Ikuno et al. | 430/58.7 |
| 6,172,176 B1 | * | 1/2001 | Tanaka et al. | 528/196 |
| 6,187,492 B1 | * | 2/2001 | Ri et al. | 430/96 |
| 6,187,494 B1 | * | 2/2001 | Kawamura et al. | 430/96 |
| 6,218,533 B1 | * | 4/2001 | Niimi | 430/58.7 |

* cited by examiner

*Primary Examiner*—Christopher Rodee
(74) *Attorney, Agent, or Firm*—Oblon, Spivak, McClelland, Maier & Neustadt, P.C.

(57) ABSTRACT

An electrophotographic photoconductor has an electroconductive support, and a photoconductive layer formed thereon containing as an effective component an aromatic polycarbonate resin having a structural unit of formula (2) and a structural unit with charge transporting properties, each of the structural units being contained in an amount of 5 wt. % or more of the total weight of the polycarbonate resin. There is disclosed an aromatic polycarbonate resin having a structural unit of formula (1) and the structural unit of formula (2), with the relationship between the composition ratios being $0<k/(k+j)<1$ when the composition ratio of the structural unit (1) is k and that of the structural unit (2) is j, or an aromatic polycarbonate resin having a repeat unit of formula (3). The formulas (1) to (3) are specified in the specification.

6 Claims, 7 Drawing Sheets

AROMATIC POLYCARBONATE RESIN, ELECTROPHOTOGRAPHIC PHOTOCONDUCTOR, PROCESS CARTRIDGE, AND ELECTROPHOTOGRAPHIC IMAGE FORMING METHOD AND APPARATUS

BACKGROUND OF THE INVENTION

1. Field of the Invention

The present invention relates to aromatic polycarbonate resins which are useful as the photoconductive materials for use in the electrophotographic photoconductor and as the materials for use in electronic devices such as organic electroluminescent (EL) device.

In addition, the present invention also relates to an electrophotographic photoconductor comprising an electroconductive support and a photoconductive layer formed thereon comprising an aromatic polycarbonate resin provided with improved mechanical strength.

Further, the present invention relates to an electrophotographic image forming method and apparatus using the above-mentioned electrophotographic photoconductor.

Furthermore, the present invention also relates to a process cartridge in which the above-mentioned photoconductor is incorporated.

2. Discussion of Background

Conventionally known representative aromatic polycarbonate resins are obtained by allowing 2,2-bis(4-hydroxyphenyl)propane (hereinafter referred to as bisphenol A) to react with a carbonate precursor material such as phosgene or diphenylcarbonate. Such polycarbonate resins made from bisphenol A are used in many fields because of their excellent characteristics, such as high transparency, high heat resistance, high dimensional accuracy, and high mechanical strength.

For example, this kind of polycarbonate resin is intensively studied as a binder resin for use in an organic photoconductor in the field of electrophotography.

Recently organic photoconductors are used in many copying machines and printers. These organic photoconductors have a layered structure comprising a charge generation layer (CGL) and a charge transport layer (CTL) which are successively overlaid on an electroconductive support. The charge transport layer (CTL) comprises a binder resin and a low-molecular charge transport material (CTM). There are proposed many kinds of aromatic polycarbonate resins as the above-mentioned binder resins. The addition of such a low-molecular charge transport material (CTM) to the binder resin lowers the intrinsic mechanical strength of the binder resin, so that the CTL film becomes fragile. Because of the decrease of mechanical strength of the CTL, the abrasion resistance, scratch resistance, and crack resistance of the photoconductor are lowered, with the result that the durability of the photoconductor is decreased.

Although some vinyl polymers such as polyvinyl anthracene, polyvinyl pyrene and poly-N-vinylcarbazole have been studied as high-molecular photoconductive materials for forming a charge transport complex for use in the conventional organic photoconductor, such polymers are not satisfactory from the viewpoint of photosensitivity.

In addition, high-molecular materials having charge transporting properties have been also studied to eliminate the shortcomings of the above-mentioned conventional layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 4,801,517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-18371, 4-31404, and 4-133065. However, any materials have not yet been put to practical use.

According to the report of "Physical Review B46 6705 (1992)" by M. A. Abkowitz et al., it is confirmed that the drift mobility of a high-molecular weight charge transport material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is suggested that the photoconductor employing the high-molecular weight charge transport material produces poor results in terms of the photosensitivity and the residual potential although the mechanical strength of the photoconductor is improved.

SUMMARY OF THE INVENTION

It is therefore a first object of the present invention to provide an aromatic polycarbonate resin with improved durability, which can serve as a high-molecular charge transport material in the organic photoconductor.

A second object of the present invention is to provide an electrophotographic photoconductor with high sensitivity and high durability.

A third object of the present invention is to provide an electrophotographic image forming method using the above-mentioned electrophotographic photoconductor.

A fourth object of the present invention is to provide an electrophotographic image forming apparatus using the above-mentioned electrophotographic photoconductor.

A fifth object of the present invention is to provide an electrophotographic process cartridge including the above-mentioned electrophotographic photoconductor.

The first object of the present invention can be achieved by the following aromatic polycarbonate resins:

An aromatic polycarbonate resin comprising a structural unit of formula (1) and a structural unit of formula (2), with the relationship between the composition ratios being $0 < k/(k+j) < 1$ when the composition ratio of the structural unit of formula (1) is k and that of the structural unit of formula (2) is j:

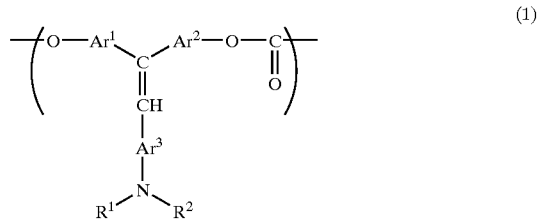

wherein $R^1$ and $R^2$, which may be the same or different, are each an acyl group, an alkyl group having 1 to 6 carbon atoms, which may have a substituent, or an aryl group which may have a substituent; and $Ar^1$, $Ar^2$, and $Ar^3$ are each a substituted or unsubstituted arylene group;

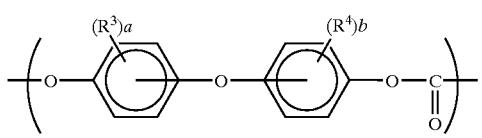
(2)

wherein a and b are each independently an integer of 1 to 4; and $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^3$ and $R^4$ may each be the same or different when a and b are each an integer of 2, 3 or 4.

An aromatic polycarbonate resin comprising a repeat unit of formula (3):

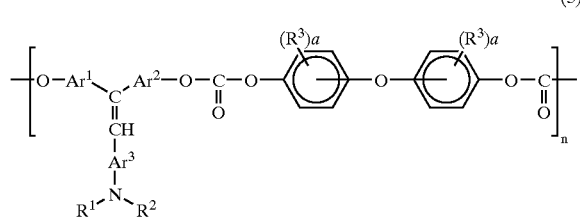
(3)

wherein $R^1$, $R^2$, $R^3$, $R^4$, $Ar^1$, $Ar^2$, $Ar^3$, a, and b are the same as those previously defined, and n is an integer of 2 to 5,000, which represents a degree of polymerization.

An aromatic polycarbonate resin comprising a structural unit of the following formula (4) and the above-mentioned structural unit of formula (2), with the relationship between the composition ratios being $0<k/(k+j)<1$ when the composition ratio of the structural unit of formula (4) is k and that of the structural unit of formula (2) is j:

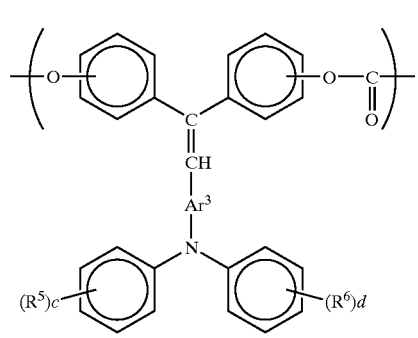
(4)

wherein c and d are each independently an integer of 0 to 5; $R^5$ and $R^6$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^5$ and $R^6$ may each be the same or different when c and d are each an integer of 2, 3, 4 or 5; and $Ar^3$ is a substituted or unsubstituted arylene group.

An aromatic polycarbonate resin comprising a repeat unit of formula (5):

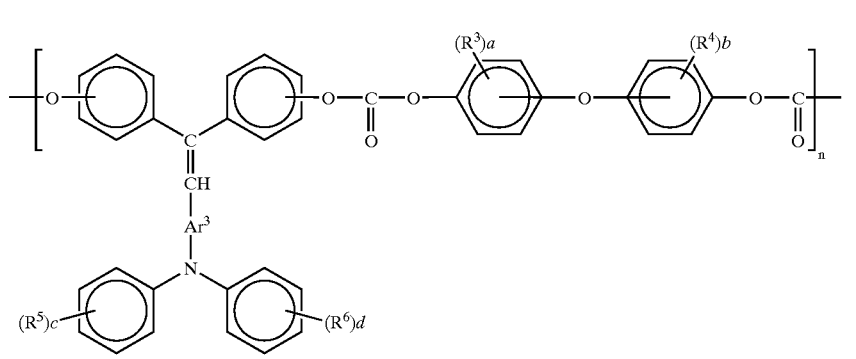
(5)

wherein a, b, c, d, $R^3$, $R^4$, $R^5$, $R^6$, and $Ar^3$ are the same as those previously defined, and n is an integer of 2 to 5,000, which represents a degree of polymerization.

An aromatic polycarbonate resin comprising the above-mentioned structural unit of formula (1) and a structural unit of the following formula (6), with the relationship between the composition ratios being $0<k/(k+j)<1$ when the composition ratio of the structural unit of formula (1) is k and that of the structural unit of formula (6) is j:

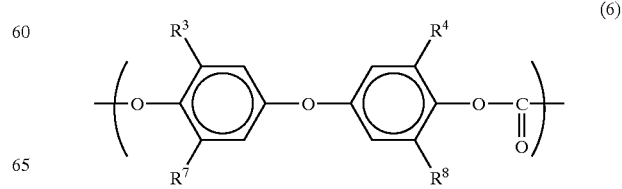
(6)

wherein $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent; and $R^7$ and $R^8$ are each independently a hydrogen atom, a halogen atom, an alkyl group having 1 to 6 carbon atoms, which may have a substituent, an alkoxyl group having 1 to 6 carbon atoms, which may have a substituent, or an aryl group which may have a substituent.

An aromatic polycarbonate resin comprising a repeat unit of formula (7):

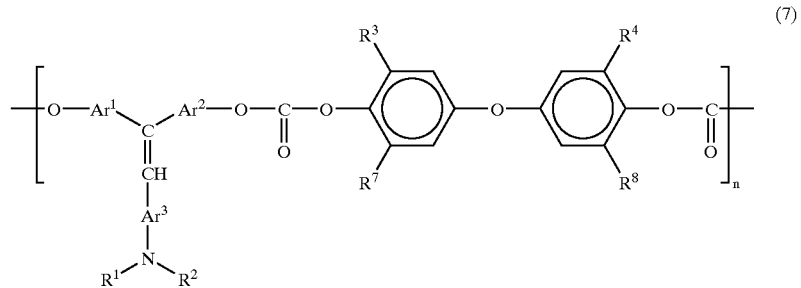

(7)

wherein $R^1$, $R^2$, $R^3$, $R^4$, $R^7$, $R^8$, $Ar^1$, $Ar^2$, $Ar^3$ and n are the same as those previously defined.

An aromatic polycarbonate resin comprising the above-mentioned structural unit of formula (4) and the above-mentioned structural unit of formula (6), with the relationship between the composition ratios being $0<k/(k+j)<1$ when the composition ratio of the structural unit of formula (4) is k and that of the structural unit of formula (6) is j.

An aromatic polycarbonate resin comprising a repeat unit of formula (8):

wherein c, d, $Ar^3$, $R^3$, $R^4$, $R^5$, $R^6$, $R^7$, $R^8$ and n are the same as those previously defined.

An aromatic polycarbonate resin comprising the above-mentioned structural unit of formula (1), and a structural unit of the following formula (23), with the relationship between the composition ratios being $0<k/(k+j)<1$ when the composition ratio of the structural unit of formula (1) is k and that of the structural unit of formula (23) is j:

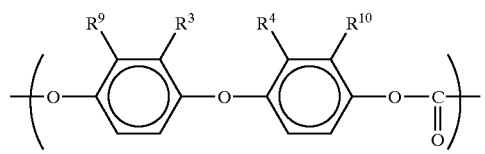

(23)

wherein $R^3$ and $R^4$ are each independently a halogen atom, an alkyl group having 1 to 6 carbon atoms, which may have a substituent, an alkoxyl group having 1 to 6 carbon atoms,

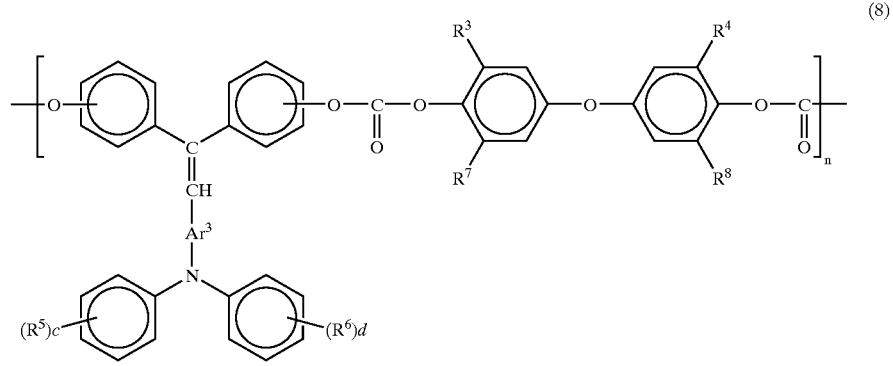

(8)

which may have a substituent, or an aryl group which may have a substituent; and $R^9$ and $R^{10}$ are each independently a halogen atom, an alkyl group having 1 to 6 carbon atoms, which may have a substituent, an alkoxyl group having 1 to 6 carbon atoms, which may have a substituent, or an aryl group which may have a substituent.

An aromatic polycarbonate resin comprising a repeat unit of formula (25):

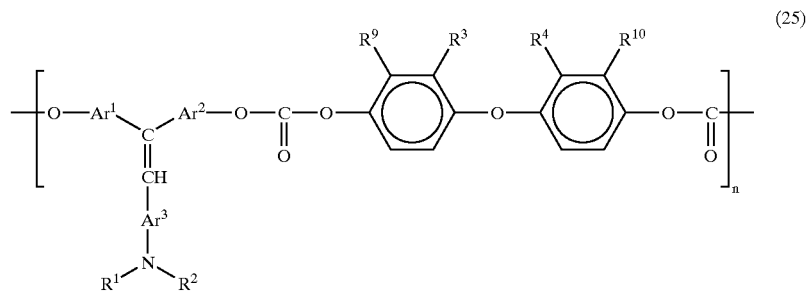

(25)

wherein $R^1$, $R^2$, $R^3$, $R^4$, $R^9$, $R^{10}$, $Ar^1$, $Ar^2$, $Ar^3$ and n are the same as those previously defined.

An aromatic polycarbonate resin comprising the above-mentioned structural unit of formula (1), and a structural unit of the following formula (24), with the relationship between the composition ratios being $0<k/(k+j)<1$ when the composition ratio of the structural unit of formula (1) is k and that of the structural unit of formula (24) is j:

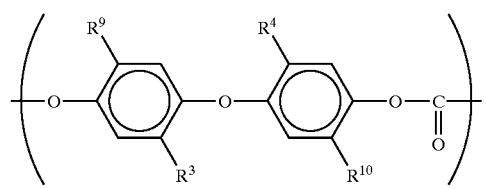

(24)

wherein $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent; and $R^9$ and $R^{10}$ are each independently a halogen atom, an alkyl group having 1 to 6 carbon atoms, which may have a substituent, an alkoxyl group having 1 to 6 carbon atoms, which may have a substituent, or an aryl group which may have a substituent.

An aromatic polycarbonate resin comprising a repeat unit of formula (26):

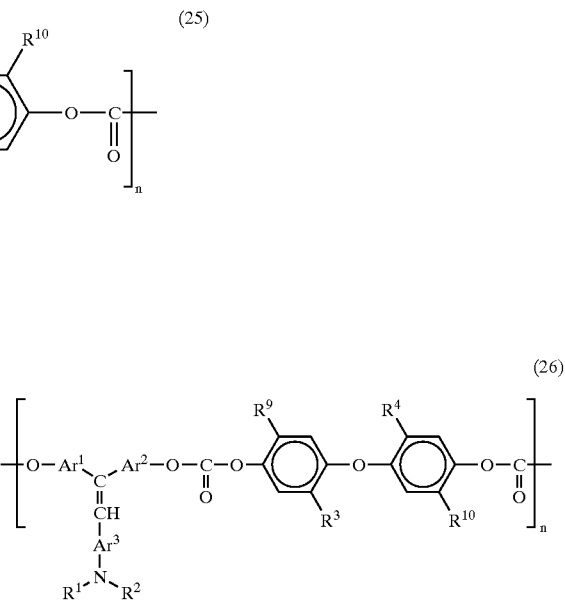

(26)

wherein $R^1$, $R^2$, $R^3$, $R^4$, $R^9$, $R^{10}$, $Ar^1$, $Ar^2$, $Ar^3$, and n are the same as those previously defined.

An aromatic polycarbonate resin comprising the above-mentioned structural unit of formula (4), and the above-mentioned structural unit of formula (23), with the relationship between the composition ratios being $0<k/(k+j)<1$ when the composition ratio of the structural unit of formula (4) is k and that of the structural unit of formula (23) is j.

An aromatic polycarbonate resin comprising a repeat unit of formula (27):

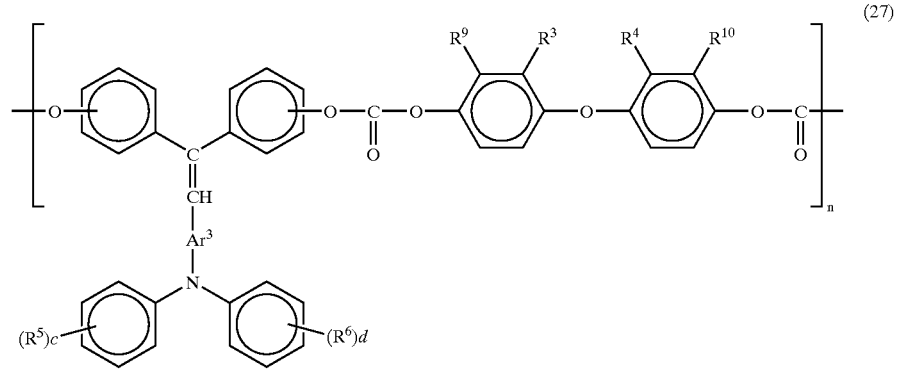

(27)

wherein c, d, $Ar^3$, $R^3$, $R^4$, $R^5$, $R^6$, $R^9$, $R^{10}$, and n are the same as those previously defined.

An aromatic polycarbonate resin comprising the above-mentioned structural unit of formula (4), and the above-mentioned structural unit of formula (24), with the relationship between the composition ratios being 0<k/(k+j)<1 when the composition ratio of the structural unit of formula (4) is k and that of the structural unit of formula (24) is j.

An aromatic polycarbonate resin comprising a repeat unit of formula (28):

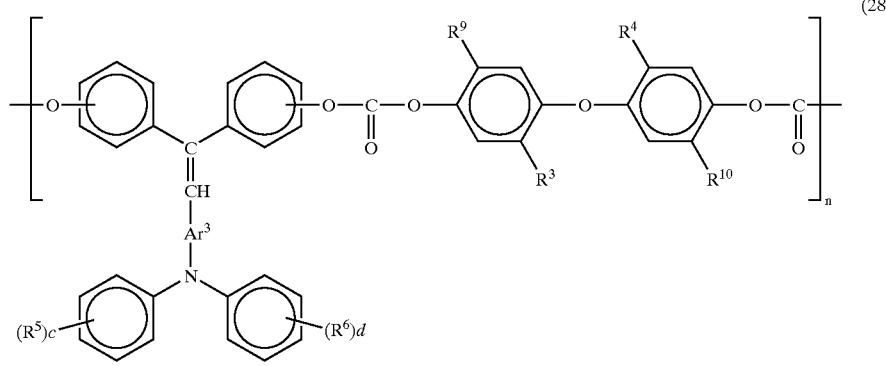

(28)

wherein c, d, $Ar^3$, $R^3$, $R^4$, $R^5$, $R^6$, $R^9$, $R^{10}$, and n are the same as those previously defined.

The second object of the present invention can be achieved by an electrophotographic photoconductor comprising an electroconductive support, and a photoconductive layer formed thereon comprising as an effective component an aromatic polycarbonate resin which comprises the structural unit of formula (2) and a structural unit with charge transporting properties, each of the structural units being contained in an amount of 5 wt. % or more of the total weight of the polycarbonate resin:

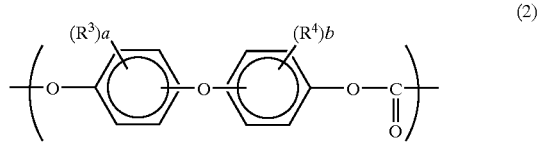

(2)

wherein a and b are each independently an integer of 1 to 4; and $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^3$ and $R^4$ may each be the same or different when a and b are each an integer of 2, 3 or 4.

It is preferable that the structural unit with charge transporting properties be contained in an amount of 10 to 90 wt. % of the total weight of the polycarbonate resin in the above-mentioned electrophotographic photoconductor.

In the aforementioned electrophotographic photoconductor, the structural unit with charge transporting properties may be represented by formula (1'):

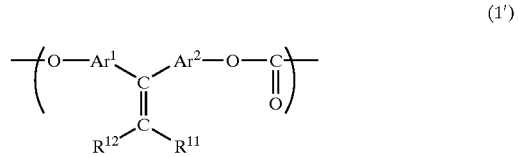

(1')

wherein $R^{11}$ is a hydrogen atom, an alkyl group which may have a substituent, or an aryl group which may have a substituent; $Ar^1$ and $Ar^2$ are each an arylene group which may have a substituent; and $R^{12}$ is an aryl group which may have a substituent.

The aromatic polycarbonate resin for use in the photoconductive layer may comprise a repeat unit of formula (3'):

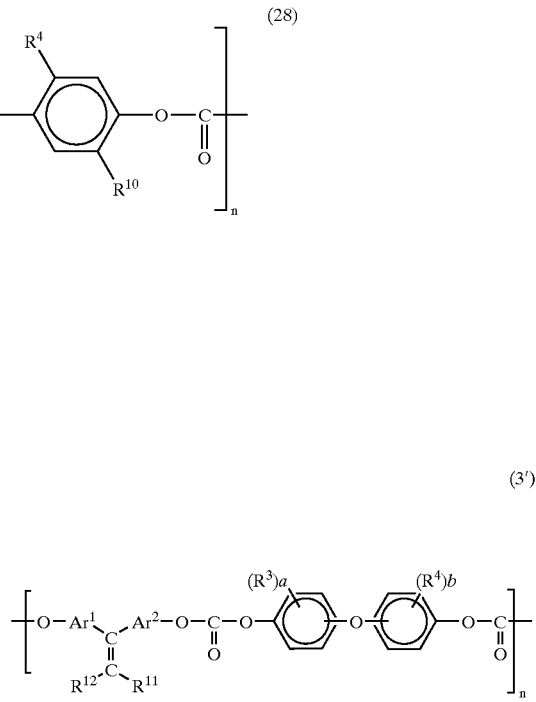

(3')

wherein a, b, $R^3$, $R^4$, $R^{11}$, $R^{12}$, $Ar^1$, $Ar^2$, and n are the same as those previously defined.

Alternatively, in the electrophotographic photoconductor, the structural unit with charge transporting properties may be the above-mentioned structural unit of formula (1).

The aromatic polycarbonate resin for use in the photoconductive layer may comprise the previously mentioned repeat unit of formula (3).

The third object of the present invention can be achieved by an electrophotographic image forming method comprising the steps of charging the surface of a photoconductor, exposing the charged surface of the photoconductor to a light image corresponding to an original image to be reproduced, thereby forming a latent electrostatic image on the photoconductor, developing the latent electrostatic image to a visible image, transferring the visible image to an image receiving member, cleaning the surface of the photoconductor, and quenching the residual potential on the surface of the photoconductor, wherein the photoconductor is any of the above-mentioned photoconductors comprising the aromatic polycarbonate resin.

The fourth object of the present invention can be achieved by an electrophotographic image forming apparatus comprising a photoconductor capable of forming a latent electrostatic image thereon, charging means for charging the surface of the photoconductor, light exposure means for exposing the charged surface of the photoconductor to a light image corresponding to an original image to be reproduced, thereby forming a latent electrostatic image on the photoconductor, development means for developing the latent electrostatic image to a visible image, image transfer means for transferring the visible image to an image receiving member, cleaning means for cleaning the surface of the photoconductor, and quenching means for quenching the residual potential on the surface of the photoconductor, wherein the photoconductor is any of the above-mentioned photoconductors comprising the aromatic polycarbonate resin.

The fifth object of the present invention can be achieved by an electrophotographic process cartridge comprising an electrophotographic photoconductor capable of forming a latent electrostatic image thereon, wherein the electrophotographic photoconductor is any of the above-mentioned photoconductors comprising the aromatic polycarbonate resin.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
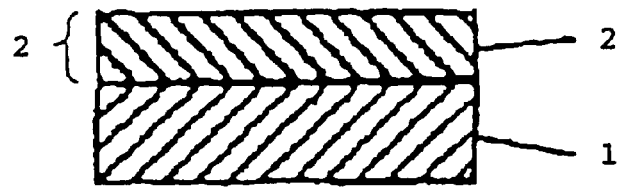
FIG. 1 is a schematic cross-sectional view of a first example of the electrophotographic photoconductor according to the present invention.

The aromatic polycarbonate resin according to the present invention is prepared in the form of a copolymer resin comprising the above-mentioned structural unit of formula (1) or (4) with charge transporting properties, and the structural unit of formula (2), (6), (23) or (24) capable of providing the obtained resin with other properties than the charge transporting properties, that is, the mechanical strength. Alternatively, according to the present invention, the aromatic polycarbonate resin is in the form of an alternating copolymer resin comprising a repeat unit of formula (3), (5), (7), (8), (25), (26), (27), or (28), each having charge transporting properties and high mechanical strength.

The previously mentioned polycarbonate resins in the form of a copolymer resin and an alternating copolymer resin are provided with charge transporting properties and high mechanical strength. Therefore, those aromatic polycarbonate resins can exhibit satisfactory electrical characteristics, optical characteristics, and physical characteristics when used in a photoconductive layer of the electrophotographic photoconductor.

The method of producing the above-mentioned aromatic polycarbonate resins according to the present invention will now be explained in detail.

The aromatic polycarbonate resins of the present invention can be obtained by the conventional synthesizing method, that is, polymerization of a bisphenol and a carbonic acid derivative.

To be more specific, the aromatic polycarbonate resins can be produced by ester interchange with a bisarylcarbonate compound, using at least one kind of diol with charge transporting properties, represented by the following formula (9) or (10), and at least one kind of diol represented by the following formula (11), (12), (30), or (31).

Alternatively, the polymerization of the diols with a halogenated carbonyl compound such as phosgene may be carried out in accordance with solution polymerization or interfacial polymerization, or the polymerization of the diols with a chloroformate such as bischloroformate derived from the diols.

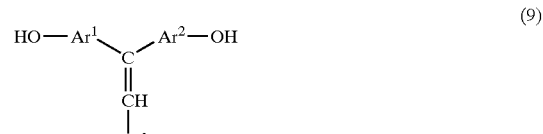

(9)

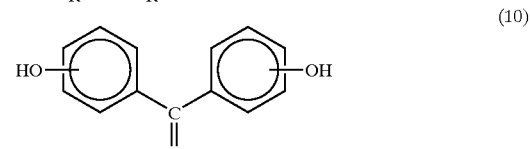

(10)

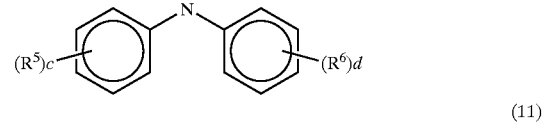

(11)

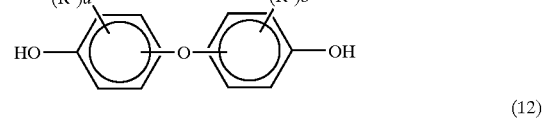

(12)

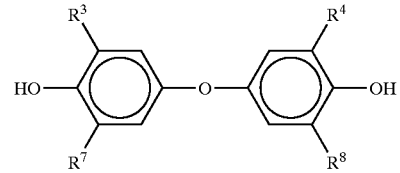

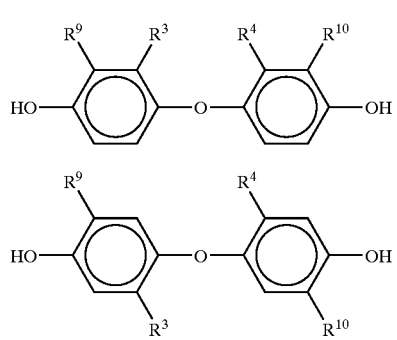

wherein $R^1$ to $R^{10}$, $Ar^1$ to $Ar^3$, and a, b, c, and d are the same as those previously defined.

In addition to phosgene, trichloromethyl chloroformate that is a dimer of phosgene, and bis(trichloromethyl) carbonate that is a trimer of phosgene are usable as the halogenated carbonyl compounds in the above-mentioned polymerization. Further, halogenated carbonyl compounds derived from other halogen atoms than chlorine, for example, carbonyl bromide, carbonyl iodide, and carbonyl fluoride are also employed.

Such conventional synthesis methods are described in the reference, for example, "Handbook of Polycarbonate Resin" (issued by The Nikkan Kogyo Shimbun Ltd.).

Further, various kinds of copolymers, such as a random copolymer, an alternating copolymer, a block copolymer, a random alternating copolymer, and a random block copolymer can be obtained by appropriately selecting the polymerization procedure.

For instance, a random copolymer comprising the structural unit of formula (1) or (4), and the structural unit of formula (2), (6), (23) or (24) can be obtained when the diol of formula (9) or (10) with charge transporting properties and the diol of formula (11), (12), (30) or (31) are uniformly mixed prior to the condensation reaction with the phosgene. A random block copolymer can be obtained by the addition of a plurality of diols in the course of the reaction. Further, an alternating copolymer comprising a repeat unit of formula (3), (5), (7), (8), (25), (26), (27) or (28) can be produced by carrying out the condensation reaction of a bischloroformate compound derived from the diol of formula (11), (12), (30) or (31) and the diol having charge transporting properties, represented by formula (9) or (10). In such a case, the above-mentioned alternating copolymer comprising a repeat unit of formula (3), (5), (7), (8), (25), (26), (27) or (28) can be similarly produced by carrying out the condensation reaction of a bischloroformate compound derived from the diol of formula (9) or (10) having charge transporting properties, and the diol of formula (11), (12), (30) or (31). Further, a random alternating copolymer can be produced by employing a plurality of bischloroformate compounds and/or diol compounds in the course of the aforementioned condensation reaction.

The interfacial polymerization is carried out at the interface between two phases of an alkaline aqueous solution of diols and an organic solvent which is substantially incompatible with water and capable of dissolving a polycarbonate therein in the presence of the carbonic acid derivative and a catalyst. In this case, a polycarbonate resin with a narrow molecular-weight distribution can be speedily obtained by emulsifying the reactive medium through the high-speed stirring operation or addition of an emulsifying material.

As a base for preparing the alkaline aqueous solution of diols, there can be employed an alkali metal and an alkaline earth metal. Specific examples of the base include hydroxides such as sodium hydroxide, potassium hydroxide, and calcium hydroxide; and carbonates such as sodium carbonate, potassium carbonate, calcium carbonate, and sodium hydrogencarbonate. Those bases may be used alone or in combination. Of those bases, sodium hydroxide and potassium hydroxide are preferable. In addition, distilled water or deionized water are preferably employed for the preparation of the above-mentioned alkaline aqueous solution of diols.

Examples of the organic solvent used in the above-mentioned interfacial polymerization are aliphatic halogenated hydrocarbon solvents such as dichloromethane, 1,2-dichloroethane, 1,2-dichloroethylene, trichloroethane, tetrachloroethane, and dichloropropane; aromatic halogenated hydrocarbon solvents such as chlorobenzene and dichlorobenzene; and mixed solvents thereof. Further, aromatic hydrocarbon solvents such as toluene, xylene, and ethylbenzene, or aliphatic hydrocarbon solvents such as hexane and cyclohexane may be added to the above-mentioned solvents. The aliphatic halogenated hydrocarbon solvents and aromatic halogenated hydrocarbon solvents are preferable, and in particular, dichloromethane and chlorobenzene are preferably employed in the present invention.

Examples of the catalyst used in the preparation of the polycarbonate resin include a tertiary amine, a quaternary ammonium salt, a tertiary phosphine, a quaternary phosphonium salt, a nitrogen-containing heterocyclic compound and salts thereof, an iminoether and salts thereof, and an amide-group-containing compound.

Specific examples of such catalysts are trimethylamine, triethylamine, tri-n-propylamine, tri-n-hexylamine, N,N,N',N'-tetramethyl-1,4-tetramethylene-diamine, 4-pyrrolidinopyridine, N,N'-dimethylpiperazine, N-ethylpiperidine, benzyltrimethylammonium chloride, benzyltriethylammonium chloride, tetramethylammonium chloride, tetraethylammonium bromide, phenyltriethylammonium chloride, triethylphosphine, triphenylphosphine, diphenylbutylphosphine, tetra(hydroxymethyl)phosphonium chloride, benzyltriethylphosphonium chloride, benzyltriphenylphosphonium chloride, 4-methylpyridine, 1-methylimidazole, 1,2-dimethylimidazole, 3-methylpyridazine, 4,6-dimethylpyrimidine, 1-cyclohexyl-3,5-dimethylpyrazole, and 2,3,5,6-tetramethylpyrazine.

Those catalysts may be used alone or in combination. Of the above-mentioned catalysts, the tertiary amine, in particular, a tertiary amine having 3 to 30 carbon atoms, such as triethylamine is preferably employed in the present invention. Before and/or after the carbonic acid derivatives such as phosgene and bischloroformate are placed in the reaction system, any of the above-mentioned catalysts may be added thereto.

To prevent oxidation of the diols in the alkaline aqueous solution in the course of the polymerization reaction, an antioxidant such as hydrosulfite may be used.

The interfacial polymerization reaction is generally carried out at temperature in the range of 0 to 40° C., and terminated in several minutes to 5 hours. It is desirable to maintain the reaction system to pH 10 or more.

In the case of the solution polymerization, the diols are dissolved in a proper solvent to prepare a solution of the diols, and a deacidifying agent is added thereto. Then, the bischloroformate compound, or phosgene or the like is added to the above prepared mixture. In this case, tertiary amine compounds such as trimethylamine, triethylamine and tripropylamine, and pyridine can be used as the deacidifying agents.

Examples of the solvent for use in the above-mentioned solution polymerization are halogenated hydrocarbon solvents such as dichloromethane, dichloroethane, trichloroethane, tetrachloroethane, trichloroethylene, and chloroform; cyclic ethers such as tetrahydrofuran and dioxane; and pyridine.

The reaction temperature is generally in the range of 0 to 40° C. In this case, the solution polymerization is generally terminated in several minutes to 5 hours.

In the case where the polycarbonate resin is synthesized by the ester interchange method, the diols and the bisarylcarbonate are mixed in the presence of an inert gas, and the reaction is carried out at a temperature in the range of 120 to 350° C. under reduced pressure. The pressure in the reaction system is stepwise reduced to 1 mmHg or less in order to distill away the phenols generated during the reaction from the reaction system. The reaction is usually terminated in about one to 4 hours. When necessary, the antioxidant may be added to the reaction system. As the bisarylcarbonate compound, diphenyl carbonate, di-p-tolyl carbonate, phenyl-p-tolyl carbonate, di-p-chlorophenyl carbonate, and dinaphthyl carbonate can be employed.

To control the molecular weight of the obtained polycarbonate resin, it is desirable to employ a terminator as a molecular weight modifier in any of the above-mentioned polymerization reactions. Consequently, a substituent derived from the terminator may be bonded to the end of the molecule of the obtained polycarbonate resin.

As the terminator for use in the present invention, a monovalent aromatic hydroxy compound and haloformate derivatives thereof, and a monovalent carboxylic acid and halide derivatives thereof can be used alone or in combination.

Specific examples of the monovalent aromatic hydroxy compound are phenols such as phenol, p-cresol, o-ethylphenol, p-ethylphenol, p-isopropylphenol, p-tert-butylphenol, p-cumylphenol, p-cyclohexylphenol, p-octylphenol, p-nonylphenol, 2,4-xylenol, p-methoxyphenol, p-hexyloxyphenol, p-decyloxyphenol, o-chlorophenol, m-chlorophenol, p-chlorophenol, p-bromophenol, pentabromophenol, pentachlorophenol, p-phenylphenol, p-isopropenylphenol, 2,4-di(1'-methyl-1'-phenylethyl)phenol, β-naphthol, α-naphthol, p-(2',4',4'-trimethyl-chromanyl)phenol, and 2-(4'-methoxyphenyl)-2-(4"-hydroxyphenyl)propane. In addition, alkali metal salts and alkaline earth metal salts of the above phenols can also be employed. Various haloformate derivatives of the above-mentioned aromatic hydroxy compounds can be used as the terminators.

Specific examples of the monovalent carboxylic acid are aliphatic acids such as acetic acid, propionic acid, butyric acid, valeric acid, caproic acid, heptanic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 3,5-dimethylcaproic acid, and phenoxyacetic acid; and benzoic acids such as benzoic acid, p-methylbenzoic acid, p-tert-butylbenzoic acid, p-butoxybenzoic acid, p-octyloxybenzoic acid, p-phenylbenzoic acid, p-benzylbenzoic acid, and p-chlorobenzoic acid. In addition, alkali metal salts and alkaline earth metal salts of the above-mentioned aliphatic acids and benzoic acids can also be employed. In addition, various halide derivatives of the above-mentioned monovalent carboxylic acids can be employed as the terminators.

The molecular weight of the obtained aromatic polycarbonate resin can be freely controlled by adding any of the above-mentioned terminators in the course of the polymerization reaction or prior to the polymerization reaction.

Furthermore, the above-mentioned terminator can be used as a protectant for the end group of the molecule of the obtained polycarbonate resin. By the addition of the terminator after completion of the polymerization reaction, the end group of the obtained polycarbonate resin can be protected and provided with various functions.

The above-mentioned terminators may be used alone or in combination. Of those terminators, the monovalent aromatic hydroxy compound is preferable. Preferable examples of the terminators include phenol, p-tert-butylphenol, p-cumylphenol, and phenyl chloroformate.

In the present invention, it is preferable that the aromatic polycarbonate resin thus obtained have a number-average molecular weight of 1,000 to 1,000,000, more preferably in the range of 2,000 to 500,000 when expressed by the styrene-reduced value. When the molecular weight of the aromatic polycarbonate resin is within the above-mentioned range, the mechanical strength is sufficient so that occurrence of cracks in the film can be inhibited in the course of film formation, and the solubility of the obtained polycarbonate resin in the commonly used solvents is appropriate so that the increase in viscosity of the obtained resin solution can be prevented, which will improve the coating operation by use of the resin solution.

Furthermore, a branching agent may be added in a small amount during the polymerization reaction in order to improve the mechanical properties of the obtained polycarbonate resin. Any compounds that have three or more reactive groups, which may be the same or different, selected from the group consisting of an aromatic hydroxyl group, a haloformate group, a carboxylic acid group, a carboxylic acid halide group, and an active halogen atom can be used as the branching agents for use in the present invention.

Specific examples of the branching agents for use in the present invention are as follows:
phloroglucinol,
4,6-dimethyl-2,4,6-tris(4'-hydroxyphenyl)-2-heptene,
4,6-dimethyl-2,4,6-tris(4'-hydroxyphenyl)heptane,
1,3,5-tris(4'-hydroxyphenyl)benzene,
1,1,1-tris(4'-hydroxyphenyl)ethane,
1,1,2-tris(4'-hydroxyphenyl)propane,
α,α,α'-tris(4'-hydroxyphenyl)-1-ethyl-4-isopropylbenzene,
2,4-bis[α-methyl-α-(4'-hydroxyphenyl)ethyl]phenol,
2-(4'-hydroxyphenyl)-2-(2",4"-dihydroxyphenyl)-propane,
tris(4-hydroxyphenyl)phosphine,
1,1,4,4-tetrakis(4'-hydroxyphenyl)cyclohexane,
2,2-bis[4',4'-bis(4"-hydroxyphenyl)cyclohexyl]-propane,
α,α,α',α'-tetrakis(4'-hydroxyphenyl)-1,4-diethylbenzene,
2,2,5,5-tetrakis(4'-hydroxyphenyl)hexane,
1,1,2,3-tetrakis(4'-hydroxyphenyl)propane,
1,4-bis(4',4"-dihydroxytriphenylmethyl)benzene,
3,3',5,5'-tetrahydroxydiphenyl ether,
3,5-dihydroxybenzoic acid,
3,5-bis(chlorocarbonyloxy)benzoic acid,
4-hydroxyisophthalic acid,
4-chlorocarbonyloxyisophthalic acid,
5-hydroxyphthalic acid,
5-chlorocarbonyloxyphthalic acid,
trimesic trichloride, and
cyanuric chloride.

Those branching agents may be used alone or in combination.

The polycarbonate resin thus synthesized is purified by removing the catalyst and the antioxidant used in the polymerization; unreacted diol and terminator; and impurities such as an inorganic salt generated during the polymerization. Through the above-mentioned purifying procedure, the polycarbonate resin can be used, for example, in the photoconductive layer of the electrophotographic photoconductor according to the present invention. The previously mentioned "Handbook of Polycarbonate Resin" (issued by Nikkan Kogyo Shimbun Ltd.) can be referred to for such a procedure for purifying the polycarbonate resin. To the aromatic polycarbonate resin produced by the previously mentioned methods, various additives such as an antioxidant, a light stabilizer, a thermal stabilizer, a lubricant, and a plasticizer can be added when necessary.

The structural units of formulas (1) and (2), which are the basic structural units for the preparation of the aromatic polycarbonate resins according to the present invention, will be now explained in detail.

The alkyl group mentioned in the structural units for use in the present invention is a straight-chain, branched, or cyclic alkyl group having 1 to 6 carbon atoms. The alkyl group may have a substituent such as a fluorine atom, cyano group, or a phenyl group which may have a substituent selected from the group consisting of a halogen atom, and a straight-chain or branched, or cyclic alkyl group having 1 to 6 carbon atoms.

Specific examples of such a substituted or unsubstituted alkyl group are methyl group, ethyl group, n-propyl group, iso-propyl group, t-butyl group, s-butyl group, n-butyl group, iso-butyl group, trifluoromethyl group, 2-cyanoethyl group, benzyl group, 4-chlorobenzyl group, 4-methylbenzyl group, cyclopentyl group, and cyclohexyl group.

Specific examples of the substituted or unsubstituted alkoxyl group mentioned in the structural units for use in the present invention are methoxy group, ethoxy group, n-propoxy group, iso-propoxy group, n-butoxy group, iso-butoxy group, s-butoxy group, t-butoxy group, 2-hydroxyethoxy group, 2-cyanoethoxy group, benzyloxy group, 4-methylbenzyloxy group, and trifluoromethoxy group.

Examples of the acyl group represented by $R^1$ and $R^2$ are acetyl group, propionyl group, and benzoyl group.

Examples of the halogen atom represented by $R^3$ to $R^{10}$ are fluorine atom, chlorine atom, bromine atom, and iodine atom.

As the aryl group represented by $R^1$ to $R^{10}$, which includes a heterocyclic group, there can be employed phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidene-phenyl group, 5H-dibenzo[a,d]cycloheptenylidenephenyl group, thienyl group, benzothienyl group, furyl group, benzofuranyl group, carbazolyl group, pyridinyl group, pyrrolidyl group, and oxazolyl group.

The above-mentioned aryl group may have a substituent such as the previously mentioned substituted or unsubstituted alkyl group, substituted or unsubstituted alkoxyl group, or a halogen atom such as fluorine atom, chlorine atom, bromine atom, or iodine atom.

In addition to the above, a group represented by the following formula (13) can be employed as $R^1$ and $R^2$ when $R^1$ and $R^2$ are each a substituted or unsubstituted aryl group:

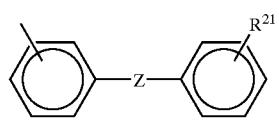

(13)

wherein Z is —O—, —S—, —SO—, —SO$_2$—, —CO—, —(CH$_2$)$_n$—, or

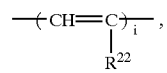

in which $R^{21}$ is a hydrogen atom, a substituted or unsubstituted alkyl group, a substituted or unsubstituted alkoxyl group, a halogen atom, a substituted or unsubstituted aryl group, substituted or unsubstituted arylamino group, nitro group, or cyano group; $R^{22}$ is a hydrogen atom, a substituted or unsubstituted alkyl group, or a substituted or unsubstituted aryl group; h is an integer of 1 to 12; and i is an integer of 1 to 3.

In the above, as the substituted or unsubstituted arylamino group, there can be employed an amino group having one or two substituted or unsubstituted aryl groups as the substituents.

As a substituted or unsubstituted arylene group represented by $Ar^1$ to $Ar^3$, there can be employed any bivalent groups derived from the substituted or unsubstituted aryl group as defined in the previous description.

The structural unit of formula (1') will now be explained in detail.

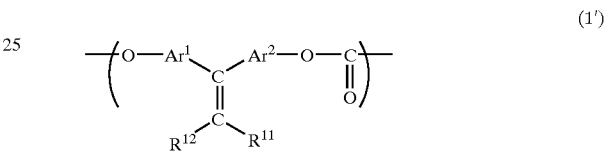

(1')

wherein $Ar^1$ and $Ar^2$ are each an arylene group which may have a substituent; $R^{11}$ is a hydrogen atom, an alkyl group which may have a substituent, or an aryl group which may have a substituent; and $R^{12}$ is an aryl group which may have a substituent.

When $R^{11}$ is a substituted aryl group, an amino group represented by the following formula (14) may be used as the substituent.

(14)

wherein $R^{23}$ and $R^{24}$ are each a substituted or unsubstituted alkyl group or a substituted or unsubstituted aryl group, and $R^{23}$ and $R^{24}$ may form a ring together or in combination with a carbon atom of the aryl group to constitute piperidino group, morpholino group, or julolidyl group.

In formula (1'), $R^{12}$ is an aryl group which may have a substituent. In addition to the above-mentioned examples of aryl group, there can be employed a monovalent group derived from a heterocyclic group having an amine structure, such as pyrrole, pyrazole, imidazole, triazole, dioxazole, indole, isoindole, benzimidazole, benzotriazole, benzisoxazine, carbazole, phenoxazine, and a group represented by the following formula (15):

(15)

wherein $R^{25}$ and $R^{26}$ are each an acyl group, an alkyl group which may have a substituent, or an aryl group which may have a substituent; $Ar^4$ is an arylene group; and p is an integer of 1 to 3.

The above-mentioned groups may have a substituent such as a substituted or unsubstituted alkyl group, a substituted or unsubstituted aryl group, or a halogen atom.

When $R^{25}$ and $R^{26}$ are each a substituted or unsubstituted aryl group, the previously mentioned group of formula (13) is adaptable.

Various kinds of diols have been studied to obtain an aromatic polycarbonate resin capable of serving as a photoconductive material with improved mechanical durability. For instance, Japanese Laid-Open Patent Applications 11-29634 and 11-30873 disclose aromatic polycarbonate resins which are produced using diols having an ether skeleton and a thioether skeleton, such as 4,4'-dihydroxydiphenyl ether and 4,4'-dihydroxydiphenylsulfide. Even though such conventional aromatic polycarbonate resins are used in the electrophotographic photoconductor, sufficient durability cannot be obtained. In the prior art, there is no description about the effect of any substituent in the structure of conventional diols.

The inventors of the present invention have discovered that the durability of the polycarbonate resins comprising the structural unit of formula (2) or (6) is superior to that of the polycarbonate resins with the conventional ether skeleton. The structural unit of formula (2) or (6) is characterized in that an ether skeleton is included, with a benzene ring having at least one substitutent. The reason why the durability of the obtained polycarbonate resin comprising the structural unit of formula (2) or (6) is remarkably improved has not yet been clarified, but the substituent on the benzene ring is supposed to work as an internal plasticizer in the polymeric molecular chain. The similar effect of improving the durability can be caused by the repeat unit of formula (3), (5), (7) or (8) because the structural unit of formula (2) or (6) is included in the above-mentioned repeat unit.

Furthermore, the durability of the aromatic polycarbonate resin comprising the structural unit of formula (23) or (24) is also improved because of the presence of a substituent at the opposition with respect to the ether linkage moiety. Such a mechanism is also unknown, but it is supposed that the substituent situated at the opposition with respect to the ether linkage moiety can serve as a protectant for the ether linkage moiety, that is, a part of the main chain, and accordingly, chemical deterioration can be inhibited. Owing to the presence of such a substituent, the main chain of the polycarbonate resin can be prevented from being cut, whereby sufficient mechanical strength and durability of the obtained polycarbonate resin can be maintained. The similar effect of improving the durability can be caused by the repeat unit of formula (25), (26), (27) or (28) because the structural unit of formula (23) or (24) is included in the above-mentioned repeat unit.

In the aromatic polycarbonate resin copolymer comprising the structural unit of formula (1) or (4) and the structural unit of formula (2), (6), (23) or (24), the amount ratio of the structural unit of formula (1) or (4) may be freely determined, but preferably 5 wt. % or more, more preferably 10 to 90 wt. % in view of the charge transporting properties.

In the preparation of the aromatic polycarbonate resins according to the present invention, a diol with charge transporting properties, represented by the previously mentioned formula (9) or (10) is employed. In addition to the diol of formula (9) or (10), any conventional diols with charge transporting properties are usable as it is in order to improve the electrical and mechanical characteristics of the obtained polycarbonate resin.

Examples of the above-mentioned conventional diols with charge transporting properties are as follows: acetophenone derivatives (Japanese Laid-Open Patent Applications 7-325409, 7-258399, 8-269183, and 9-151248), distyrylbenzene derivatives (Japanese Laid-Open Patent Application 9-71642), diphenetylbenzene derivatives (Japanese Laid-Open Patent Applications 9-127713 and 9-104746), α-phenylstilbene derivatives (Japanese Laid-Open Patent Applications 9-297419, 11-2909, 9-241369, 9-272735, and 11-5836), butadiene derivatives (Japanese Laid-Open Patent Applications 9-80783 and 9-235367), hydrogenated butadiene derivatives (Japanese Laid-Open Patent Applications 9-80784 and 9-87376), diphenylcyclohexane derivatives (Japanese Laid-Open Patent Applications 9-80772 and 9-110976), distyryltriphenylamine derivatives (Japanese Laid-Open Patent Applications 9-222740 and 9-268226), distyryldiamine derivatives (Japanese Laid-Open Patent Applications 11-218948 and 11-60718), diphenyldistyrylbenzene derivatives (Japanese Laid-Open Patent Applications 9-265197, 9-265201, 9-221544, and 9-227669), stilbene derivatives (Japanese Laid-Open Patent Applications 9-211877, 11-72937, 9-157378, and 11-71453), m-phenylenediamine derivatives (Japanese Laid-Open Patent Applications 9-304956, 9-304957, 9-302084, and 9-302085), resorcin derivatives (Japanese Laid-Open Patent Applications 9-329907 and 9-328539), and triarylamine derivatives (Japanese Laid-Open Patent Applications 64-9964, 7-199503, 8-176293, 8-208820, 8-253568, 8-269446, 3-221522, 4-11627, 4-183719, 4-124163, 4-320420, 4-316543, 5-310904, 7-56374, and 8-62864, and U.S. Pat. Nos. 5,428,090 and 5,486,439.).

As mentioned above, the aromatic polycarbonate resin according to the present invention is remarkably useful as a charge transport material when used in combination with a charge generation material in the electrophotographic photoconductor, in particular, in the function-separating electrophotographic photoconductor. In addition to the above, the aromatic polycarbonate resin of the present invention can be preferably employed as electronic devices such as an organic electroluminescent (EL) device in the field of electronics.

An electrophotographic photoconductor according to the present invention will now be explained in detail.

The electrophotographic photoconductor of the present invention comprises an electroconductive support, and a photoconductive layer formed thereon comprising as an effective component an aromatic polycarbonate resin which comprises the above-mentioned structural unit of formula (2) and a structural unit with charge transporting properties, each of the structural units being contained in an amount of 5 wt. % or more of the total weight of the polycarbonate resin:

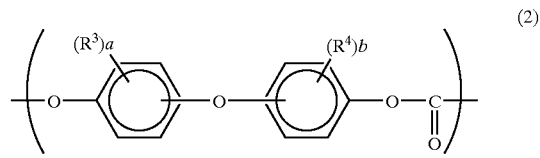

wherein a, b, $R^3$, and $R^4$ are the same as those previously defined.

In the electrophotographic photoconductor of the present invention, the photoconductive layer comprises an aromatic polycarbonate resin in the form of a copolymer which comprises the structural unit of the above-mentioned formula (2), and the structural unit with charge transporting properties, for example, represented by the above-mentioned formula (1') or (1), or an aromatic polycarbonate resin in the form of an alternating copolymer comprising a repeat unit, for example, represented by the above-mentioned formula (3') or (3). Such polycarbonate resins can exhibit high mechanical strength, so that the sensitivity of the obtained photoconductor is remarkably improved.

The above-mentioned polycarbonate resins for use in the electrophotographic photoconductor of the present invention can be produced by the previously mentioned method, using the diol of the formula (11) and the diol with charge transporting properties, such as the diol of formula (32) or formula (10). Those diols are shown below.

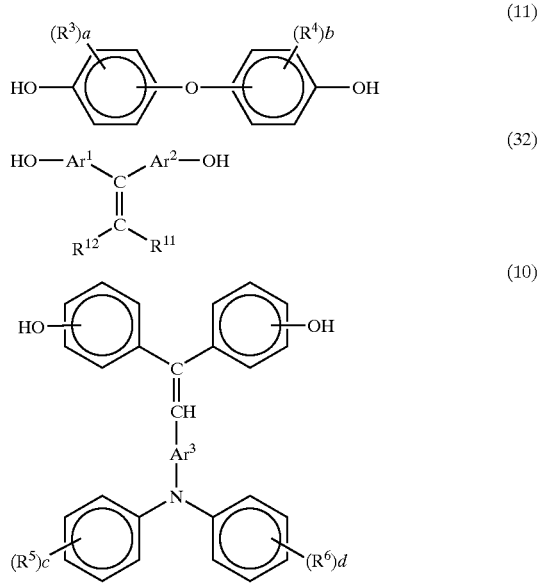

wherein $R^3$, $R^4$, $R^5$, $R^6$, $R^{11}$, $R^{12}$, $Ar^1$, $Ar^2$, $Ar^3$, a, and b are the same as those previously defined.

Further, various kinds of copolymers, such as a random copolymer, an alternating copolymer, a block copolymer, a random alternating copolymer, and a random block copolymer can be obtained by appropriately selecting the polymerization procedure.

For instance, a random copolymer comprising the structural unit of formula (2) and the structural unit of formula (1') or (1) can be obtained when the diol of formula (11) and the diol of formula (32) or (10) with charge transporting properties are uniformly mixed prior to the condensation reaction with the phosgene. A random block copolymer can be obtained by the addition of a plurality of diols in the course of the reaction. Further, an alternating copolymer comprising a repeat unit of formula (3') or (3) can be produced by carrying out the condensation reaction of a bischloroformate compound derived from the diol of formula (11) and the diol having charge transporting properties, represented by formula (32) or (10). In such a case, the above-mentioned alternating copolymer comprising a repeat unit of formula (3) or (3') can be similarly produced by carrying out the condensation reaction of a bischloroformate compound derived from the diol of formula (32) or (10) having charge transporting properties and the diol of formula (11). Further, a random alternating copolymer can be produced by employing a plurality of bischloroformate compounds and/or diol compounds in the course of the aforementioned condensation reaction.

A desired aromatic polycarbonate resin comprising at least one structural unit of formula (2) and at least one structural unit having charge transporting properties such as the structural unit of formula (1') or (1) can be provided by freely employing the diol of formula (11) in combination with the diol with charge transporting properties, represented by formula (32) or (10). In such a case, the amount ratio of the diol of formula (11) to the diol of formula (32) or (10) may be selected within a wide range in light of the desired characteristics of the obtained aromatic polycarbonate resin so that each of the structural unit of formula (2), and the structural unit with charge transporting properties is contained in an amount of 5 wt. % or more of the total weight of the produced aromatic polycarbonate resin. Furthermore, it is preferable that the structural unit with charge transporting properties be contained in an amount of 10 to 90 wt. % of the total weight of the polycarbonate resin.

The durability of the polycarbonate resin is remarkably improved by using the diol of formula (11) as the starting material. In order to control the mechanical properties of the obtained resin, the aromatic polycarbonate resin in the form of a copolymer may further comprise other conventional structural units. In this case, the structural units for use in the conventional polycarbonate resins, for example, as described in the previously mentioned reference "Handbook of Polycarbonate Resin" (issued by The Nikkan Kogyo Shimbun Ltd.) can be utilized. One of the preferable structural units for use in the polycarbonate resin is a structural unit represented by the following formula (33) which is conventionally known:

The starting material for the aforementioned structural unit of formula (33) is a diol represented by the following formula (34):

wherein X is a substituted or unsubstituted bivalent aliphatic group, a substituted or unsubstituted bivalent cyclic aliphatic group, a substituted or unsubstituted bivalent aromatic group, a bivalent group prepared by bonding the aforementioned bivalent groups, or a bivalent group represented by formula (16), (17), or (18):

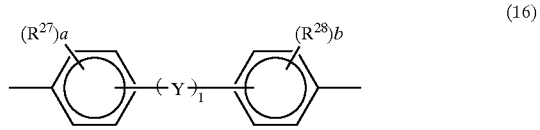

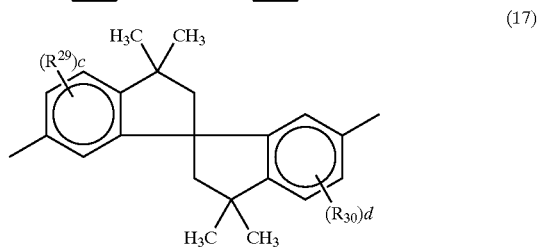

(18)

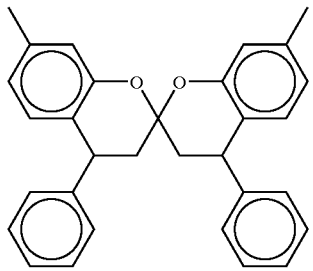

in which $R^{27}$, $R^{28}$, $R^{29}$, $R^{30}$ are each independently an alkyl group which may have a substituent, an aryl group which may have a substituent, or a halogen atom; a and b are each independently an integer of 0 to 4; c and d are each independently an integer of 0 to 3; and l is an integer of 0 or 1, and when l=1, Y is a straight-chain alkylene group having 2 to 12 carbon atoms, a substituted or unsubstituted branched alkylene group having 3 to 12 carbon atoms, a bivalent group comprising at least one alkylene group having 1 to 10 carbon atoms and at least one oxygen atom and/or sulfur atom, —O—, —S—, —SO—, —SO$_2$—, —CO—, —COO—,

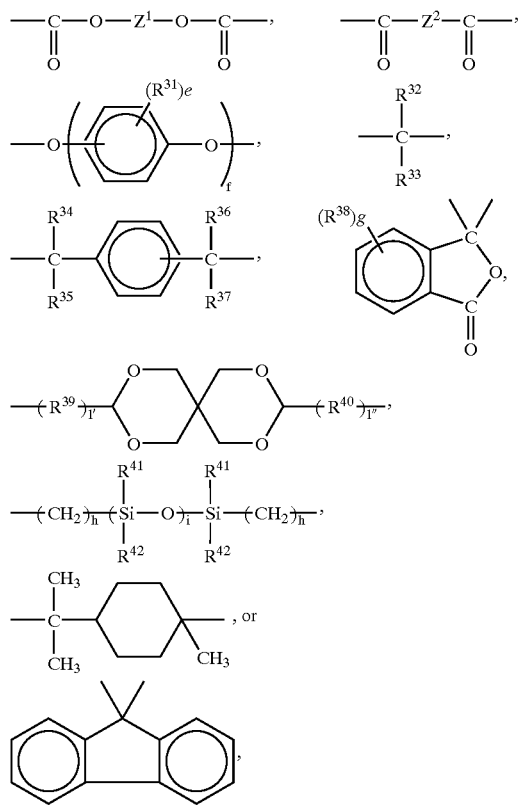

in which $Z^1$ and $Z^2$ are each a substituted or unsubstituted bivalent aliphatic group, or a substituted or unsubstituted arylene group; $R^{31}$, $R^{32}$, and $R^{38}$ are each independently a halogen atom, a substituted or unsubstituted alkyl group, a substituted or unsubstituted alkoxyl group, or a substituted or unsubstituted aryl group; $R^{33}$, $R^{34}$, $R^{35}$, $R^{36}$, and $R^{37}$ are each independently a hydrogen atom, a halogen atom, a substituted or unsubstituted alkyl group, a substituted or unsubstituted alkoxyl group, or a substituted or unsubstituted aryl group, and $R^{32}$ and $R^{33}$ may form together a carbon ring having 5 to 12 carbon atoms; l' and l" are each an integer of 0 or 1, and when l'=1 and l"=1, $R^{39}$ and $R^{40}$ are each an alkylene group having 1 to 4 carbon atoms; $R^{41}$ and $R^{42}$ are each independently a substituted or unsubstituted alkyl group or a substituted or unsubstituted aryl group; e and g are each independently an integer of 0 to 4; f is an integer of 1 or 2; h is an integer of 0 to 20; and i is an integer of 0 to 2000.

By using such a diol of formula (34), there can be obtained a copolymer resin with improved mechanical properties. In this case, the diols represented by formula (34) can be used alone or in combination in the previously mentioned polymerization reaction.

The above-mentioned structural unit of formula (33) will now be explained by referring to the diol of formula (34) that is the starting material for the structural unit of formula (33).

In the case where X in the diol of formula (34) represents a bivalent aliphatic group or a bivalent cyclic aliphatic group, the representative examples of the diol are as follows: ethylene glycol, diethylene glycol, triethylene glycol, polyethylene glycol, polytetramethylene ether glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl)propane, xylylenediol, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene, 1,4-bis(6-hydroxyhexyl)benzene, and isophorone diol.

In the case where X in the diol of formula (34) represents a bivalent aromatic group, there can be employed any bivalent groups derived from the same substituted or unsubstituted aryl group as previously defined.

When Y in the formula (16) is a bivalent group comprising at least one alkylene group having 1 to 10 carbon atoms and at least one oxygen atom and/or sulfur atom, as mentioned above, the following specific examples can be employed:

OCH$_2$CH$_2$O,
OCH$_2$CH$_2$OCH$_2$CH$_2$O,
OCH$_2$CH$_2$OCH$_2$CH$_2$OCH$_2$CH$_2$O,
OCH$_2$CH$_2$CH$_2$O,
OCH$_2$CH$_2$CH$_2$CH$_2$O,
OCH$_2$CH$_2$CH$_2$CH$_2$CH$_2$CH$_2$O,
OCH$_2$CH$_2$CH$_2$CH$_2$CH$_2$CH$_2$CH$_2$CH$_2$O,
CH$_2$O,
CH$_2$CH$_2$O,
CHE$_t$OCHE$_t$O (E$_t$=ethylene group),
CHCH$_3$O,
SCH$_2$OCH$_2$S,
CH$_2$OCH$_2$,
OCH$_2$OCH$_2$O,
SCH$_2$CH$_2$OCH$_2$OCH$_2$CH$_2$S,
OCH$_2$CHCH$_3$OCH$_2$CHCH$_3$O,
SCH$_2$S,
SCH$_2$CH$_2$S,
SCH$_2$CH$_2$CH$_2$S,
SCH$_2$CH$_2$CH$_2$CH$_2$S, SCH$_2$CH$_2$CH$_2$CH$_2$CH$_2$CH$_2$S,
SCH$_2$CH$_2$SCH$_2$CH$_2$S, and
SCH$_2$CH$_2$OCH$_2$CH$_2$OCH$_2$CH$_2$S.

When Y in formula (16) represents a branched alkylene group having 3 to 12 carbon atoms, there can be employed as the substituent an aryl group which may have a substituent or a halogen atom.

When $Z^1$ and $Z^2$ are each a substituted or unsubstituted bivalent aliphatic group, there can be employed any bivalent groups obtained by removing hydroxyl group from the diol of formula (34) where X represents a bivalent aliphatic group or bivalent cyclic aliphatic group.

When $Z^1$ and $Z^2$ are each a substituted or unsubstituted arylene group, there can be employed any bivalent groups derived from the above-mentioned substituted or unsubstituted aryl group.

Preferable examples of the diol of formula (34) in which X represents a bivalent aromatic group are as follows:
bis(4-hydroxyphenyl)methane,
bis(2-methyl-4-hydroxyphenyl)methane,
bis(3-methyl-4-hydroxyphenyl)methane,
1,1-bis(4-hydroxyphenyl)ethane,
1,2-bis(4-hydroxyphenyl)ethane,
bis(4-hydroxyphenyl)phenylmethane,
bis(4-hydroxyphenyl)diphenylmethane,
1,1-bis(4-hydroxyphenyl)-1-phenylethane,
1,3-bis(4-hydroxyphenyl)-1,1-dimethylpropane,
2,2-bis(4-hydroxyphenyl)propane,
2-(4-hydroxyphenyl)-2-(3-hydroxyphenyl)propane,
1,1-bis(4-hydroxyphenyl)-2-methylpropane,
2,2-bis(4-hydroxyphenyl)butane,
1,1-bis(4-hydroxyphenyl)-3-methylbutane,
2,2-bis(4-hydroxyphenyl)pentane,
2,2-bis(4-hydroxyphenyl)-4-methylpentane,
2,2-bis(4-hydroxyphenyl)hexane,
4,4-bis(4-hydroxyphenyl)heptane,
2,2-bis(4-hydroxyphenyl)nonane,
bis(3,5-dimethyl-4-hydroxyphenyl)methane,
2,2-bis(3-methyl-4-hydroxyphenyl)propane,
2,2-bis(3-isopropyl-4-hydroxyphenyl)propane,
2,2-bis(3-sec-butyl-4-hydroxyphenyl)propane,
2,2-bis(3-tert-butyl-4-hydroxyphenyl)propane,
2,2-bis(3-cyclohexyl-4-hydroxyphenyl)propane,
2,2-bis(3-allyl-4-hydroxyphenyl)propane,
2,2-bis(3-phenyl-4-hydroxyphenyl)propane,
2,2-bis(3,5-dimethyl-4-hydroxyphenyl)propane,
2,2-bis(3-chloro-4-hydroxyphenyl)propane,
2,2-bis(3,5-dichloro-4-hydroxyphenyl)propane,
2,2-bis(3-bromo-4-hydroxyphenyl)propane,
2,2-bis(3,5-dibromo-4-hydroxyphenyl)propane,
2,2-bis(4-hydroxyphenyl)hexafluoropropane,
1,1-bis(4-hydroxyphenyl)cyclopentane,
1,1-bis(4-hydroxyphenyl)cyclohexane,
1,1-bis(3-methyl-4-hydroxyphenyl)cyclohexane,
1,1-bis(3,5-dimethyl-4-hydroxyphenyl)cyclohexane,
1,1-bis(3,5-dichloro-4-hydroxyphenyl)cyclohexane,
1,1-bis(4-hydroxyphenyl)-3,3,5-trimethylcyclohexane,
1,1-bis(4-hydroxyphenyl)cycloheptane,
2,2-bis(4-hydroxyphenyl)norbornane,
2,2-bis(4-hydroxyphenyl)adamantane,
4,4'-dihydroxydiphenyl ether,
4,4'-dihydroxy-3,3'-dimethyldiphenyl ether,
ethylene glycol bis(4-hydroxyphenyl)ether,
1,3-bis(4-hydroxyphenoxy)benzene,
1,4-bis(4-hydroxyphenoxy)benzene,
4,4'-dihydroxydiphenylsulfide,
3,3'-dimethyl-4,4'-dihydroxydiphenylsulfide,
3,3',5,5'-tetramethyl-4,4'-dihydroxydiphenylsulfide,
4,4'-dihydroxydiphenylsulfoxide,
3,3'-dimethyl-4,4'-dihydroxydiphenylsulfoxide,
4,4'-dihydroxydiphenylsulfone,
3,3'-dimethyl-4,4'-dihydroxydiphenylsulfone,
3,3'-diphenyl-4,4'-dihydroxydiphenylsulfone,
3,3'-dichloro-4,4'-dihydroxydiphenylsulfone,
bis(4-hydroxyphenyl)ketone,
bis(3-methyl-4-hydroxyphenyl)ketone,
3,3,3',3'-tetramethyl-6,6'-dihydroxyspiro(bis)-indane,
3,3',4,4'-tetrahydro-4,4,4',4'-tetramethyl-2,2'-spirobi(2H-1-benzopyran)-7,7'-diol,
trans-2,3-bis(4-hydroxyphenyl)-2-butene,
9,9-bis(4-hydroxyphenyl)fluorene,
9,9-bis(4-hydroxyphenyl)xanthene,
1,6-bis(4-hydroxyphenyl)-1,6-hexanedione,
α,α,α',α'-tetramethyl-α,α'-bis(4-hydroxyphenyl)-p-xylene,
α,α,α',α'-tetramethyl-α,α'-bis(4-hydroxyphenyl)-m-xylene,
2,6-dihydroxybenzo-p-dioxane,
2,6-dihydroxythianthrene,
2,7-dihydroxyphenoxathine,
9,10-dimethyl-2,7-dihydroxyphenazine,
3,6-dihydroxydibenzofuran,
3,6-dihydroxydibenzothiophene,
4,4'-dihydroxybiphenyl,
1,4-dihydroxynaphthalene,
2,7-dihydroxypyrene,
hydroquinone,
resorcin,
4-hydroxyphenyl-4-hydroxybenzoate,
ethylene glycol-bis(4-hydroxybenzoate),
diethylene glycol-bis(4-hydroxybenzoate),
triethylene glycol-bis(4-hydroxybenzoate),
p-phenylene-bis(4-hydroxybenzoate),
1,6-bis(4-hydroxybenzoyloxy)-1H,1H,6H,6H-perfluorobutane,
1,4-bis(4-hydroxybenzoyloxy)-1H,1H,4H,4H-perfluorobutane,
1,3-bis(4-hydroxyphenyl)tetramethyldisiloxane, and
phenol-modified silicone oil.

Further, an aromatic diol having an ester linkage produced by the reaction between 2 moles of a diol and one mole of isophthaloyl chloride or terephthaloyl chloride is also usable.

Namely, to produce the aromatic polycarbonate resin comprising the structural unit of formula (2) for use in the photoconductive layer, the diol of formula (11) can be used in combination with the previously mentioned diol with the charge transporting properties in order to improve the electrical and mechanical characteristics of the obtained polycarbonate resin. Furthermore, the diol of formula (34) may be further added to the above diols to control the mechanical characteristics of the obtained polycarbonate. In this case, a plurality of diols of formula (34) may be used in combination. In such a case, the structural unit of formula (2), and the structural unit with charge transporting properties are each contained in an amount of 5 wt. % or more of the total weight of the produced aromatic polycarbonate resin.

When the aforementioned aromatic polycarbonate resin with charge transporting properties is used as a charge transport medium in the photoconductive layer of the photoconductor, the charge transport medium may further comprise a low-molecular charge transport material.

Specific examples of the above-mentioned low-molecular charge transport material are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

According to the present invention, at least one of the previously mentioned aromatic polycarbonate resins is contained in different ways, for example, in photoconductive layers 2, 2a, 2b, 2c, 2d, and 2e, as shown in FIGS. 1 through 6.

In the photoconductor shown in FIG. 1, a photoconductive layer 2 is formed on an electroconductive support 1, which photoconductive layer 2 comprises the previously mentioned aromatic polycarbonate resin and a sensitizing dye, with the addition thereto of a binder agent (binder resin) when necessary. In this photoconductor, the aromatic polycarbonate resin works as a photoconductive material, through which charge carriers necessary for the light decay of the photoconductor are generated and transported. However, the aromatic polycarbonate resin itself scarcely absorbs light in the visible light range and, therefore, it is necessary to add a sensitizing dye which absorbs light in the visible light range in order to form latent electrostatic images by use of visible light.

Figure 2:
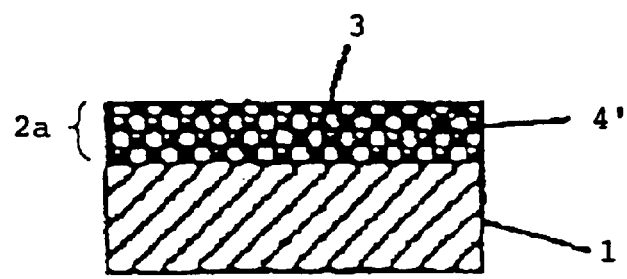
FIG. 2 is a schematic cross-sectional view of a second example of the electrophotographic photoconductor according to the present invention.

Referring to FIG. 2, there is shown an enlarged cross-sectional view of another embodiment of an electrophotographic photoconductor according to the present invention. In this photoconductor, there is formed a photoconductive layer 2a on an electroconductive support 1. The photoconductive layer 2a comprises (i) a charge transport medium 4' comprising an aromatic polycarbonate resin having charge transporting properties according to the present invention, optionally in combination with a binder agent, and (ii) a charge generation material 3 dispersed in the charge transport medium 4'. In this embodiment, the aromatic polycarbonate resin (or a mixture of the aromatic polycarbonate resin and the binder agent) constitutes the charge transport medium 4'. The charge generation material 3, which is, for example, an inorganic or organic pigment, generates charge carriers. The charge transport medium 4' accepts the charge carriers generated by the charge generation material 3 and transports those charge carriers.

In this electrophotographic photoconductor of FIG. 2, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4' and reach the surface of the charge generation material 3. Since the aromatic polycarbonate resin of the present invention do not substantially absorb light with a wavelength of 600 nm or more, it can work effectively as a charge transport material when used with the charge generation material 3 which absorbs the light in the visible region to the near infrared region and generates charge carriers. The charge transport medium 4' may further comprise the previously mentioned low-molecular charge transport material.

Figure 3:
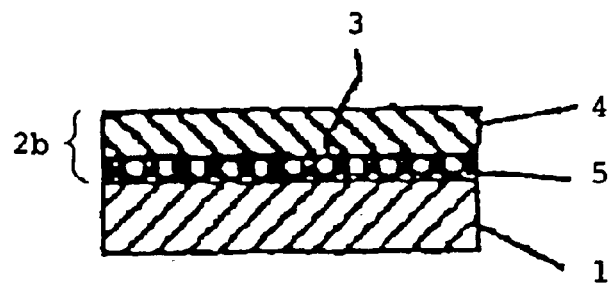
FIG. 3 is a schematic cross-sectional view of a third example of the electrophotographic photoconductor according to the present invention.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2b comprising a charge generation layer 5 containing a charge generation material 3, and a charge transport layer 4 comprising an aromatic polycarbonate resin with the charge transporting properties according to the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin of the present invention, optionally in combination with a binder agent. Furthermore, in order to increase the efficiency of generating the charge carriers, the charge generation layer 5 may further comprise the above-mentioned aromatic polycarbonate resin. For the same purpose, the photoconductive layer 2b including the charge generation layer 5 and the charge transport layer 4 may further comprise the previously mentioned low-molecular charge transport material. This can be applied to the embodiments of FIGS. 4 to 6 to be described later.

Figure 4:
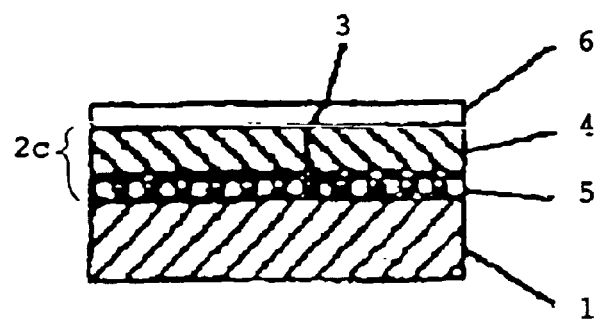
FIG. 4 is a schematic cross-sectional view of a fourth example of the electrophotographic photoconductor according to the present invention.

In the electrophotographic photoconductor of FIG. 3, a protective layer 6 may be provided on the charge transport layer 4 as shown in FIG. 4. The protective layer 6 may comprise the aromatic polycarbonate resin of the present invention, optionally in combination with a binder agent. The provision of the protective layer 6 is particularly effective when the protective layer 6 is provided on a charge transport layer of conventional low-molecular charge transport material dispersed type. The protective layer 6 may be provided on the photoconductive layer 2a of the photoconductor shown in FIG. 2.

Figure 5:
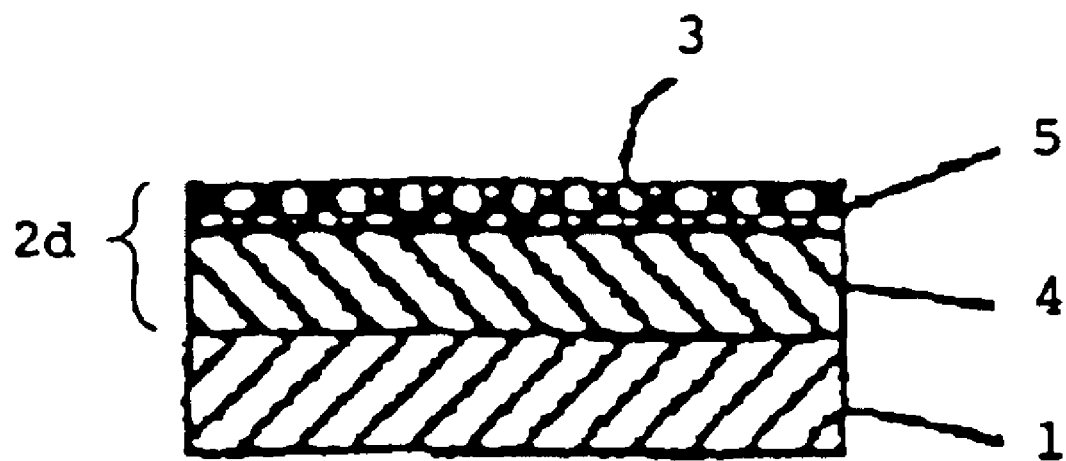
FIG. 5 is a schematic cross-sectional view of a fifth example of the electrophotographic photoconductor according to the present invention.

Referring to FIG. 5, there is shown still another embodiment of an electrophotographic photoconductor according to the present invention. In this figure, the overlaying order of the charge generation layer 5 and the charge transport layer 4 comprising the aromatic polycarbonate resin is reversed in view of the electrophotographic photoconductor shown in FIG. 3. The mechanism of generation and transportation of the charge carriers is substantially the same as that of the photoconductor shown in FIG. 3.

Figure 6:
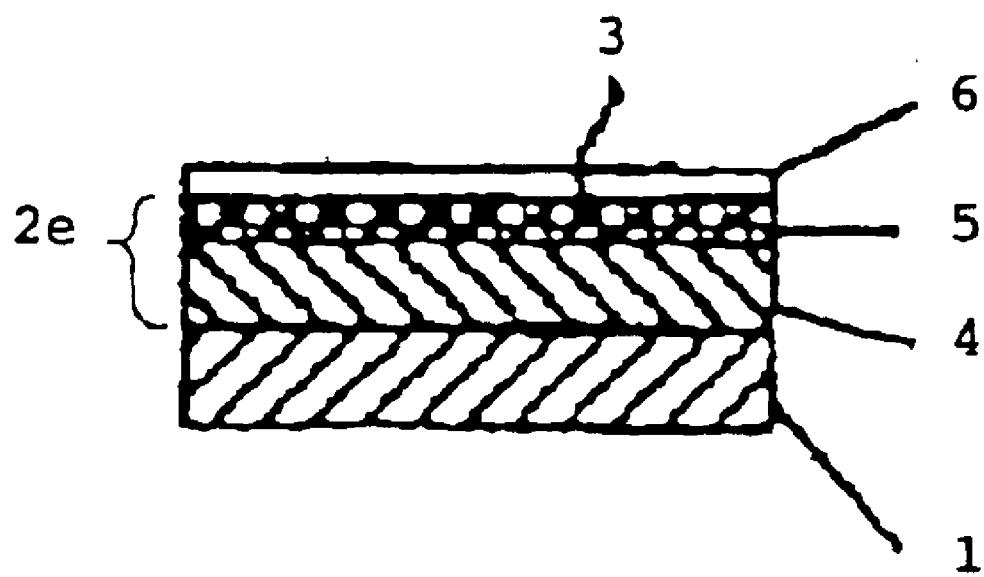
FIG. 6 is a schematic cross-sectional view of a sixth example of the electrophotographic photoconductor according to the present invention.

In the above photoconductor of FIG. 5, a protective layer 6 may be formed on the charge generation layer 5 as shown in FIG. 6 in light of the mechanical strength of the photoconductor.

When the electrophotographic photoconductor as shown in FIG. 1 is fabricated, at least one aromatic polycarbonate resin with charge transporting properties is dissolved in a solvent, with the addition thereto of a binder agent when necessary. To the thus prepared solution, a sensitizing dye is added, so that a coating liquid for photoconductive layer 2 is prepared. The thus prepared photoconductive layer coating liquid is coated on an electroconductive support 1 and dried, so that a photoconductive layer 2 is formed on the electroconductive support 1.

It is preferable that the thickness of the photoconductive layer 2 be in the range of 3 to 50 μm, more preferably in the range of 5 to 40 μm. It is preferable that the amount of the aromatic polycarbonate resin be in the range of 30 to 100 wt. % of the total weight of the photoconductive layer 2. It is preferable that the amount of sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet, and Acid Violet 6B; xanthene dyes such as Rhodamine B, Rhodamine 6G, Rhodamine G Extra, Eosin S, Erythrosin, Rose Bengale, and Fluoresceine; thiazine dyes such as Methylene Blue; and cyanine dyes such as cyanin.

The electrophotographic photoconductor shown in FIG. 2 can be produced by the following method. The finely-divided particles of the charge generation material 3 are dispersed in a solution in which at least one aromatic polycarbonate resin of the present invention, or a mixture of the aromatic polycarbonate resin and the binder agent is dissolved, so that a coating liquid for photoconductive layer 2a is prepared. The coating liquid thus prepared is coated on the electroconductive support 1 and then dried, whereby the photoconductive layer 2a is provided on the electroconductive support 1.

It is preferable that the thickness of the photoconductive layer 2a be in the range of 3 to 50 μm, more preferably in the range of 5 to 40 μm. It is preferable that the amount of the aromatic polycarbonate resin be in the range of 40 to 100 wt. % of the total weight of the photoconductive layer 2a. It is preferable that the amount of the charge generation material 3 for use in the photoconductive layer 2a be in the range of 0.1 to 50 wt. %, more preferably in the range of 1 to 20 wt. % of the total weight of the photoconductive layer 2a.

Specific examples of the charge generation material 3 for use in the present invention are as follows: inorganic materials such as selenium, selenium-tellurium, cadmium sulfide, cadmium sulfide-selenium, and α-silicon (amorphous silicon); and organic materials, for example, azo pigments, such as C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); phthalocyanine pigments such as C.I. Pigment Blue 16 (C.I. 74100); indigo pigments such as C.I. Vat Brown 5 (C.I. 73410) and C.I. Vat Dye (C.I. 73030); and perylene pigments such as Algol Scarlet B and Indanthrene Scarlet R (made by Bayer Co., Ltd.). These charge generation materials may be used alone or in combination.

When the above-mentioned charge generation material comprises a phthalocyanine pigment, the sensitivity and durability of the obtained photoconductor are remarkably improved. In such a case, there can be employed a phthalocyanine pigment having a phthalocyanine skeleton as indicated by the following formula (35):

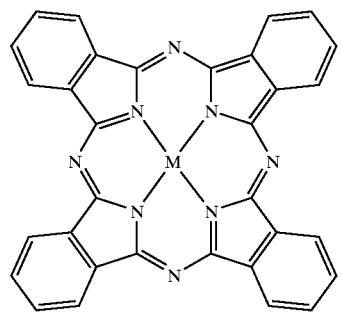

(35)

In the above formula (35), M (central atom) is a metal atom or hydrogen atom.

To be more specific, as the central atom (M) in the above formula, there can be employed an atom of H, Li, Be, Na, Mg, Al, Si, K, Ca, Sc, Ti, V, Cr, Mn, Fe, Co, Ni, Cu, Zn, Ga, Ge, Y, Zr, Nb, Mo, Tc, Ru, Rh, Pd, Ag, Cd, In, Sn, Sb, Ba, Hf, Ta, W, Re, Os, Ir, Pt, Au, Hg, Tl, La, Ce, Pr, Nd, Pm, Sm, Eu, Gd, Tb, Dy, Ho, Er, Tm, Yb, Lu, Th, Pa, U, Np, or Am; the combination of atoms forming an oxide, chloride, fluoride, hydroxide, or bromide. The central atom is not limited to the above-mentioned atoms.

The above-mentioned charge generation material with a phthalocyanine structure for use in the present invention may have at least the basic structure as indicated by the above-mentioned formula (35). Therefore, the charge generation material may have a dimer structure or trimer structure, and further, a polymeric structure. Further, the above-mentioned basic structure of the above formula (35) may have a substituent.

Of the phthalocyanine compounds represented by formula (35), an oxotitanium phthalocyanine compound which has the central atom (M) of TiO in the formula (35), and a metal-free phthalocyanine compound which has a hydrogen atom as the central atom (M) are particularly preferred in light of the properties of the obtained photoconductor.

In addition, it is known that each phthalocyanine compound has a variety of crystal systems. For example, the above-mentioned oxotitanium phthalocyanine has crystal systems of α-type, β-type, γ-type, m-type, and y-type. In the case of copper phthalocyanine, there are crystal systems of α-type, β-type, and γ-type. The properties of the phthalocyanine compound vary depending on the crystal system thereof although the central metal atom is the same. According to "Electrophotography—the Society Journal—Vol. 29, No. 4 (1990)", it is reported that the properties of the photoconductor vary depending on the crystal system of a phthalocyanine contained in the photoconductor. It is therefore important to select the optimal crystal system of each phthalocyanine compound to obtain the desired photoconductive properties. The oxotitanium phthalocyanine in the y-type crystal system is particularly advantageous.

A plurality of charge generation materials with phthalocyanine skeleton may be used in combination in the charge generation layer. Further, such charge generation materials with phthalocyanine skeleton may be used in combination with other charge generation materials not having phthalocyanine skeleton. In this case, inorganic and organic conventional charge generation materials are usable.

Specific examples of the inorganic charge generation materials are crystalline selenium, amorphous selenium, selenium-tellurium, selenium-tellurium-halogen, selenium-arsenic compound, and a-silicon (amorphous silicon). In particular, when the above-mentioned a-silicon is employed as the charge generation material, it is preferable that the dangling bond be terminated with hydrogen atom or a halogen atom, or be doped with boron atom or phosphorus atom.

Specific examples of the organic charge generation materials that can be used in combination with the phthalocyanine compound include an azulenium salt pigment, a squaric acid methine pigment, an azo pigment having a carbazole skeleton, an azo pigment having a triphenylamine skeleton, an azo pigment having a diphenylamine skeleton, an azo pigment having a dibenzothiophene skeleton, an azo pigment having a fluorenone skeleton, an azo pigment having an oxadiazole skeleton, an azo pigment having a bisstilbene skeleton, an azo pigment having a distyryl oxadiazole skeleton, an azo pigment having a distyryl carbazole skeleton, a perylene pigment, an anthraquinone pigment, a polycyclic quinone pigment, a quinone imine pigment, a diphenylmethane pigment, a triphenylmethane pigment, a benzoquinone pigment, a naphthoquinone pigment, a cyanine pigment, an azomethine pigment, an indigoid pigment, and a bisbenzimidazole pigment.

The electrophotographic photoconductor shown in FIG. 3 can be produced by the following method. To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for charge generation layer 5 is prepared. The thus prepared coating liquid is coated on the electroconductive support 1 and dried, whereby a charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic polycarbonate resin with charge transporting properties, optionally in combination with a binder agent, is dissolved is coated and dried, so that a charge transport layer 4 is formed on the charge generation layer 5. In the charge generation layer 5, the same charge generation materials as employed in the above-mentioned photoconductive layer 2a can be used.

The thickness of the charge generation layer 5 is 5 μm or less, preferably 2 μm or less. It is preferable that the thickness of the charge transport layer 4 be in the range of 3 to 50 μm, more preferably in the range of 5 to 40 μm.

When the charge generation layer 5 is provided on the electroconductive support 1 by coating the dispersion of finely-divided particles of the charge generation material 3, it is preferable that the amount of finely-divided particles of the charge generation material 3 for use in the charge generation layer 5 be in the range of 10 to 100 wt. %, more preferably in the range of about 50 to 100 wt. % of the total weight of the charge generation layer 5. It is preferable that the amount of the aromatic polycarbonate resin of the present invention be in the range of 40 to 100 wt. % of the total weight of the charge transport layer 4.

To produce the photoconductor shown in FIG. 4, a coating liquid for protective layer 6 is prepared by dissolving the previously mentioned aromatic polycarbonate resin, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 μm. It is preferable that the amount of the aromatic polycarbonate resin for use in the protective layer 6 be in the range of 40 to 100 wt. % of the total weight of the protective layer 6.

The electrophotographic photoconductor shown in FIG. 5 can be produced by the following method. The aromatic polycarbonate resin of the present invention, optionally in combination with the binder agent, is dissolved in a solvent to prepare a coating liquid for charge transport layer 4. The thus prepared coating liquid is coated on the electroconductive support 1 and dried, whereby a charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated, for example, by spray coating, and dried, so that a charge generation layer 5 is provided on the charge transport layer 4. The amount ratios of the components contained in the charge generation layer 5 and charge transport layer 4 are the same as those previously mentioned in the description of FIG. 3.

When the previously mentioned protective layer 6 is formed on the above prepared charge generation layer 5, the electrophotographic photoconductor shown in FIG. 6 can be fabricated.

To fabricate any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the above-mentioned coating liquid are condensation resins such as polyamide, polyurethane, polyester, epoxy resin, polyketone, and polycarbonate; and vinyl polymers such as polyvinylketone, polystyrene, poly-N-vinylcarbazole, and polyacrylamide. All the resins that have electrically insulating properties and adhesion properties can be employed.

Some plasticizers may be added to the above-mentioned binder agents, when necessary. Examples of the plasticizer for use in the present invention are halogenated paraffin, dimethylnaphthalene and dibutyl phthalate. Further, a variety of additives such as an antioxidant, a light stabilizer, a thermal stabilizer, and a lubricant may also be added to the binder agents when necessary.

Furthermore, in the electrophotographic photoconductor according to the present invention, an intermediate layer such as an adhesive layer or a barrier layer may be interposed between the electroconductive support and the photoconductive layer when necessary.

Examples of the material for the intermediate layer are polyamide, nitrocellulose, aluminum oxide, and titanium oxide. It is preferable that the thickness of the intermediate layer be 1 μm or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

The electrophotographic image forming apparatus and method, and the process cartridge according to the present invention will now be explained in detail with reference to FIG. 11 to FIG. 13.

Figure 11:
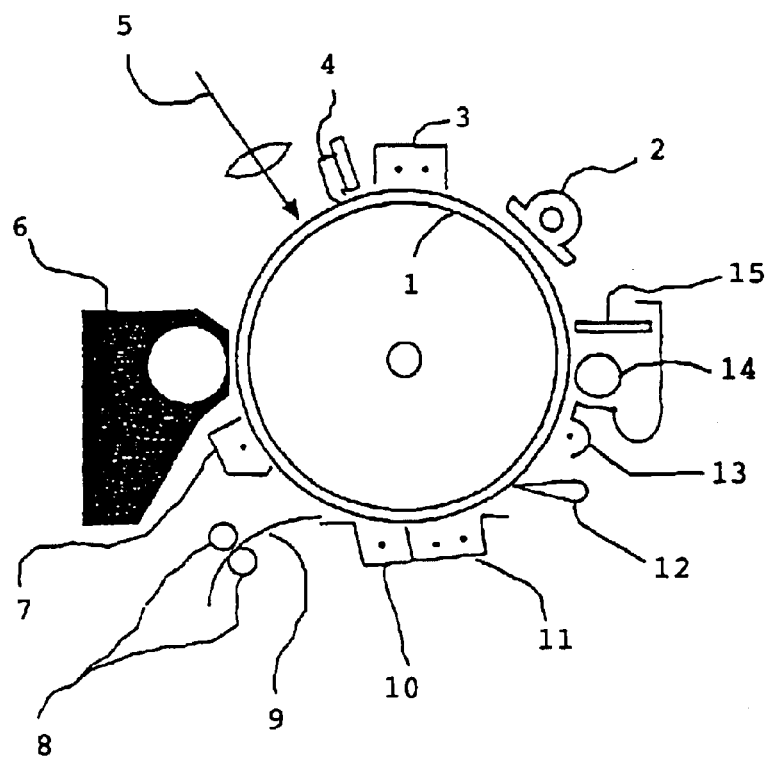
FIG. 11 is a schematic diagram in explanation of an embodiment of the electrophotographic image forming method and apparatus according to the present invention.

FIG. 11 is a schematic view which shows one embodiment of the electrophotographic image forming method and apparatus employing the electrophotographic photoconductor according to the present invention.

In FIG. 11, an electrophotographic photoconductor 1 in the form of a drum comprises an electroconductive support, and a photoconductive layer formed thereon comprising the previously mentioned aromatic polycarbonate resin.

The photoconductor may be in the form of a drum as shown in FIG. 11, a sheet, or an endless belt.

As shown in FIG. 11, there are disposed a charger 3, an eraser 4, a light exposing unit 5, a development unit 6, a pre-transfer charger 7, an image transfer charger 10, a separating charger 11, a separator 12, a pre-cleaning charger 13, a fur brush 14, a cleaning blade 15, and a quenching lamp 2 around the drum-shaped electrophotographic photoconductor 1. Reference numeral 8 indicates resist rollers.

The charger 3, the pre-transfer charger 7, the image transfer charger 10, the separating charger 11, and the pre-cleaning charger 13 may employ the conventional means such as a corotron charger, a scorotron charger, a solid state charger, and a charging roller. For the image transfer means, it is effective to employ both the image transfer charger 10 and the separating charger 11 as illustrated in FIG. 11.

As the light source for the light exposing unit 5 and the quenching lamp 2, there can be employed, for example, a fluorescent tube, tungsten lamp, halogen lamp, mercury vapor lamp, sodium light source, light emitting diode (LED), semiconductor laser (LD), and electroluminescence (EL). Further, a desired wavelength can be obtained by use of various filters such as a sharp-cut filter, bandpass filter, a near infrared cut filter, dichroic filter, interference filter, and color conversion filter.

The photoconductor may be irradiated with light in the course of the image transfer step, quenching step, cleaning step, or pre-light exposure step. In such a case, the above-mentioned light sources are usable.

The toner image formed on the photoconductor 1 using the development unit 6 is transferred to a transfer sheet 9. At the step of image transfer, all the toner particles deposited on the photoconductor 1 are not transferred to the transfer sheet 9. Some toner particles remain on the surface of the photoconductor 1. The remaining toner particles are removed from the photoconductor 1 using the fur brush 14 and the cleaning blade 15. The cleaning of the photoconductor may be carried out only by use of a cleaning brush. As the cleaning brush, there can be employed a conventional fur brush and magnetic fur brush.

When the photoconductor 1 is positively charged, and exposed to light images, positive electrostatic latent images are formed on the photoconductor. In the similar manner as in above, when a negatively charged photoconductor is exposed to light images, negative electrostatic latent images are formed. A negative toner and a positive toner are respectively used for development of the positive electrostatic images and the negative electrostatic images, thereby obtaining positive images. In contrast to this, when the positive electrostatic images and the negative electrostatic images are respectively developed using a positive toner and a negative toner, negative images can be obtained on the surface of the photoconductor 1. Not only such development means, but also the quenching means may employ the conventional manner.

Figure 12:
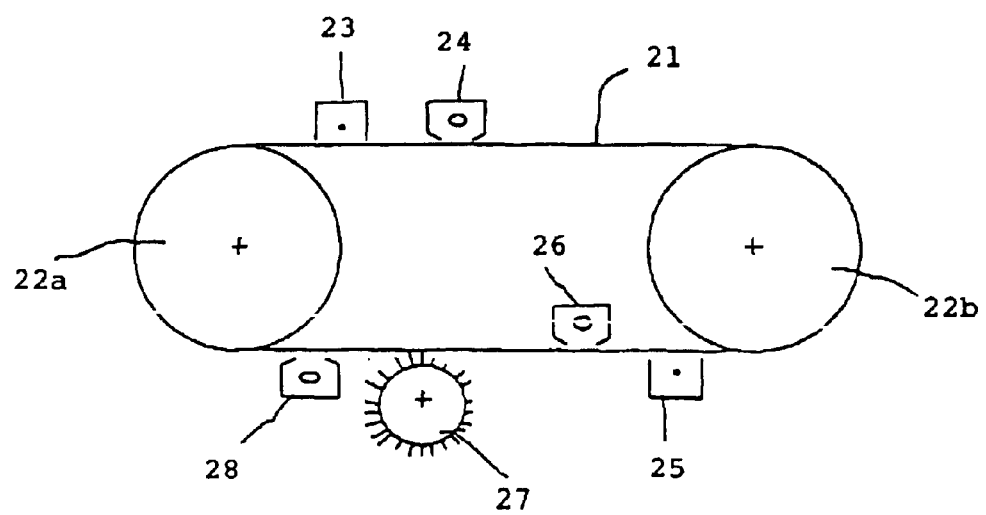
FIG. 12 is a schematic diagram in explanation of another embodiment of the electrophotographic image forming method and apparatus according to the present invention.

FIG. 12 is a schematic view which shows another embodiment of the electrophotographic image forming method and apparatus according to the present invention.

A photoconductor 21 shown in FIG. 12, which comprises an electroconductive support and the previously mentioned photoconductive layer formed thereon, is driven by driving rollers 22a and 22b. Charging of the photoconductor 21 is carried out by use of a charger 23, and the charged photoconductor 21 is exposed to light images using an image exposure light 24. Thereafter, latent electrostatic images formed on the photoconductor 21 are developed to toner images using a development unit (not shown), and the toner images are transferred to a transfer sheet with the aid of a transfer charger 25. After the toner images are transferred to the transfer sheet, the photoconductor 21 is subjected to pre-cleaning light exposure using a pre-cleaning light 26, and physically cleaned by use of a cleaning brush 27. Finally, quenching is carried out using a quenching lamp 28. In FIG. 12, the electroconductive support of the photoconductor 21 has light transmission properties, so that it is possible to apply the pre-cleaning light 26 to the electroconductive support side of the photoconductor 21. As a matter of course, the photoconductive layer side of the photoconductor 21 may be exposed to the pre-cleaning light. Similarly, the image exposure light 24 and the quenching lamp 28 may be disposed so that light is directed toward the electroconductive support side of the photoconductor 21.

The photoconductor 21 is exposed to light using the image exposure light 24, the pre-cleaning light 26, and the quenching lamp 28, as illustrated in FIG. 12. In addition to the above, light exposure may be carried out before image transfer, and before image exposure.

The above-discussed units, such as the charging unit, light-exposing unit, development unit, image transfer unit, cleaning unit, and quenching unit may be independently fixed in the inside of the copying machine, facsimile machine, or printer. Alternatively, at least one of those units may be incorporated in a process cartridge together with the photoconductor. To be more specific, the process cartridge may hold therein a photoconductor, and at least one of the charging unit, lightexposing unit, development unit, image transfer unit, cleaning unit, or quenching unit, and the process cartridge may by detachably set in the above-mentioned electrophotographic image forming apparatus.

Figure 13:
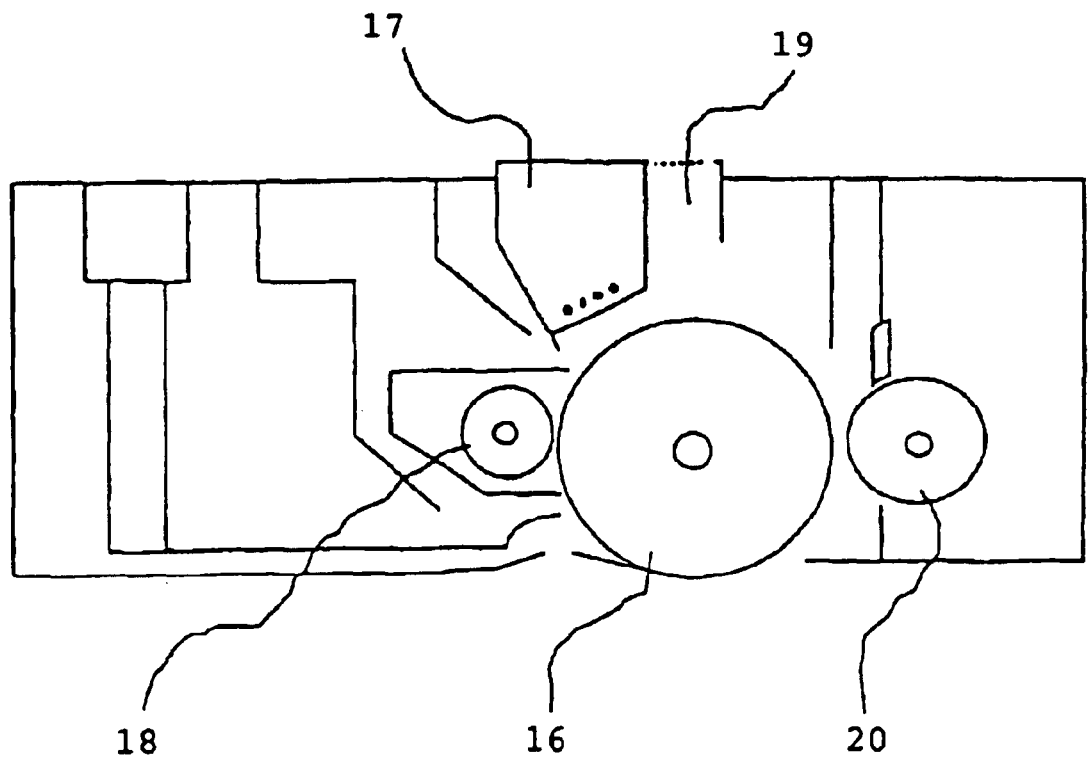
FIG. 13 is a schematic diagram in explanation of an example of the process cartridge according to the present invention.

FIG. 13 is a schematic view which shows one example of the process cartridge according to the present invention. In this embodiment of FIG. 13, there are disposed a charger 17, a light exposing unit 19, a development roller 20, and a cleaning brush 18 around a photoconductor 16.

Other features of this invention will become apparent in the course of the following description of exemplary embodiments, which are given for illustration of the invention and are not intended to be limiting thereof.

EXAMPLE 1-1

[Synthesis of Aromatic Polycarbonate Resin No. 1]

4.30 parts of a diol with charge transporting properties, that is, N-{4-[2,2-bis(4-hydroxyphenyl)vinyl]phenyl}-N,N-bis(4-tolyl)amine, 3.11 parts of a diol serving as a comonomer, that is, 4,4'-dihydroxy-3,3'-dimethyldiphenylether, and 0.04 parts of a molecular weight modifier, that is, 4-tert-butyl phenol were placed in a reaction container with stirrer.

The above prepared reaction mixture was dissolved with stirring in a stream of nitrogen, with the addition thereto of an aqueous solution prepared by dissolving 4.48 parts of sodium hydroxide and 0.08 parts of sodium hydrosulfite in 53 parts of water.

Thereafter, the reaction mixture was cooled to 20° C., and vigorously stirred with the addition thereto of a solution prepared by dissolving 3.99 parts of bis(trichloromethyl) carbonate, namely, a trimer of phosgene, in 44 parts of dichloromethane, thereby forming an emulsion. The polymerization reaction was carried out with the emulsion being formed.

The reaction mixture was then stirred for 15 minutes at room temperature. With the addition of 0.01 parts of triethylamine serving as a catalyst, the reaction mixture was further stirred for 60 minutes at room temperature. Then, a solution prepared by dissolving 0.18 parts of phenyl chloroformate serving as a terminator in 5 parts by weight of dichloromethane was added to the reaction mixture, and the resultant mixture was stirred for 60 minutes at room temperature in order to continue the reaction.

Thereafter, by the addition of 200 parts of dichloromethane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a yellow polycarbonate resin was precipitated. Thus, 7.70 parts of a polycarbonate resin No. 1 (in the form of a random copolymer) according to the present invention were obtained.

The structural units of the polycarbonate resin No. 1 are shown below, and the composition ratio of each structural unit is put beside the structural unit, on the supposition that the total number of structural units is 1.

The results of the elemental analysis were as follows:

|  | % C | % H | % N |
|---|---|---|---|
| Found | 77.25 | 4.97 | 1.38 |
| Calculated | 77.21 | 5.07 | 1.56 |

The found values were substantially the same as those obtained by calculation from the structural formula.

EXAMPLE 1-2

[Synthesis of Aromatic Polycarbonate Resin No. 2]

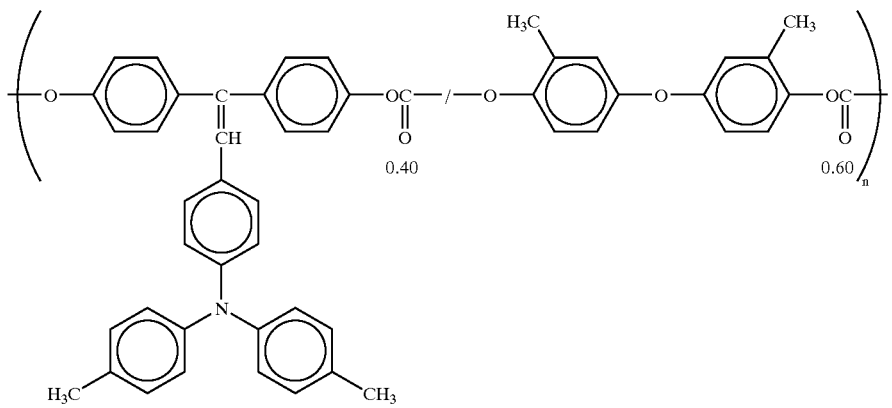

The polystyrene-reduced number-average molecular weight (Mn) and weight-average molecular weight (Mw), which were measured by gel permeation chromatography, were respectively 65,300 and 141,000.

Figure 7:
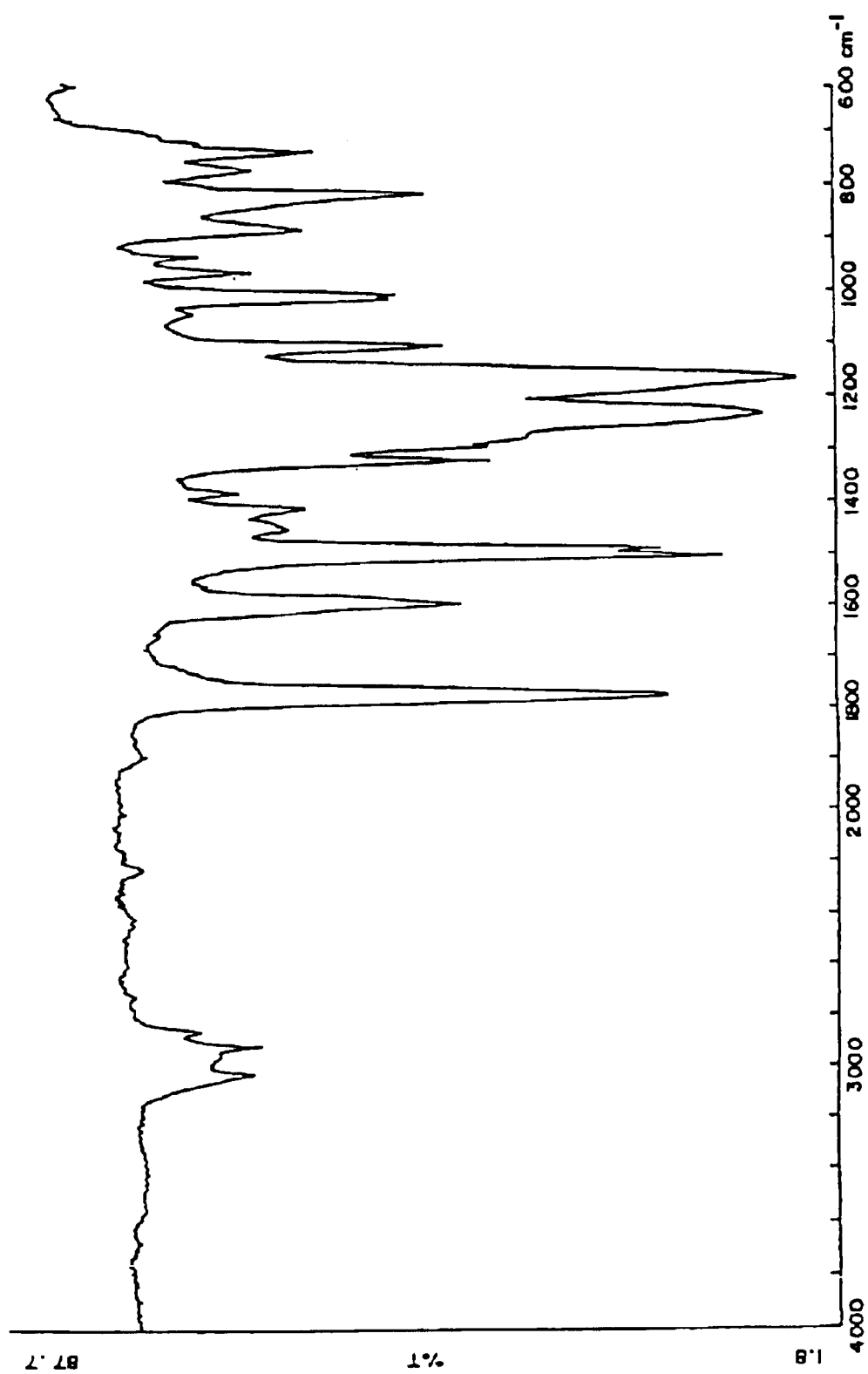
FIGS. 7 to 10 are IR spectra of aromatic polycarbonate resins No. 1 to No. 4 according to the present invention (measured from the cast film of each resin on an NaCl plate), respectively synthesized in Examples 1-1 to 1-4.

FIG. 7 shows an infrared spectrum of the aromatic polycarbonate resin No. 1, measured from the cast film on an NaCl plate. The IR spectrum indicates the appearance of the characteristic absorption peak due to C=O stretching vibration of carbonate at 1775 $cm^{-1}$.

The glass transition temperature (Tg) of the above obtained aromatic polycarbonate resin No. 1 was 149.5° C. when measured by use of a differential scanning calorimeter.

The procedure for preparation of the aromatic polycarbonate resin No. 1 in Example 1-1 was repeated except that N-{4-[2,2-bis(4-hydroxyphenyl)vinyl]phenyl}-N,N-bis(4-tolyl)amine employed as the diol having charge transporting properties in Example 1-1 was replaced by N-{4-[2,2-bis(4-hydroxyphenyl)vinyl]biphenyl}-N,N-bis(4-tolyl)amine. Thus, an aromatic polycarbonate resin No. 2 in the form of a random copolymer according to the present invention was obtained.

The structural units of the polycarbonate resin No. 2 are shown below.

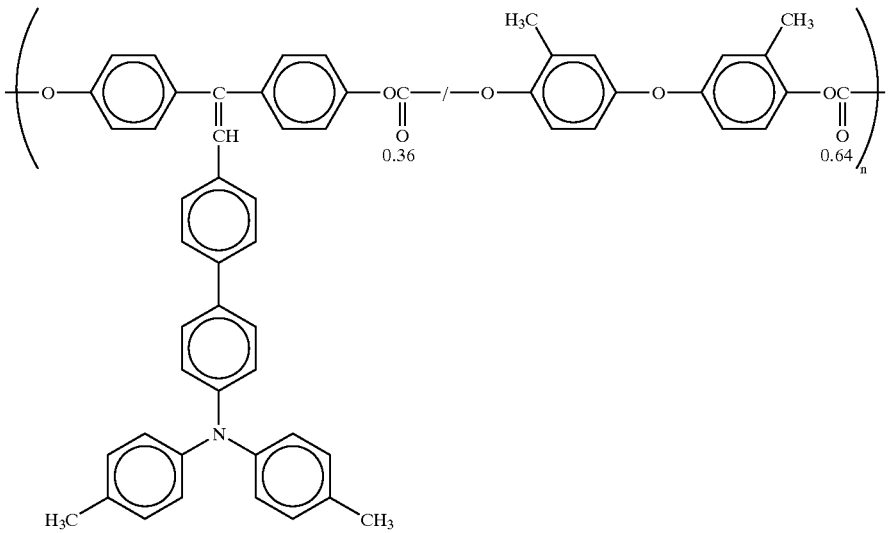

The polystyrene-reduced number-average molecular weight (Mn) and weight-average molecular weight (Mw), which were measured by gel permeation chromatography, were respectively 75,800 and 199,000.

Figure 8:
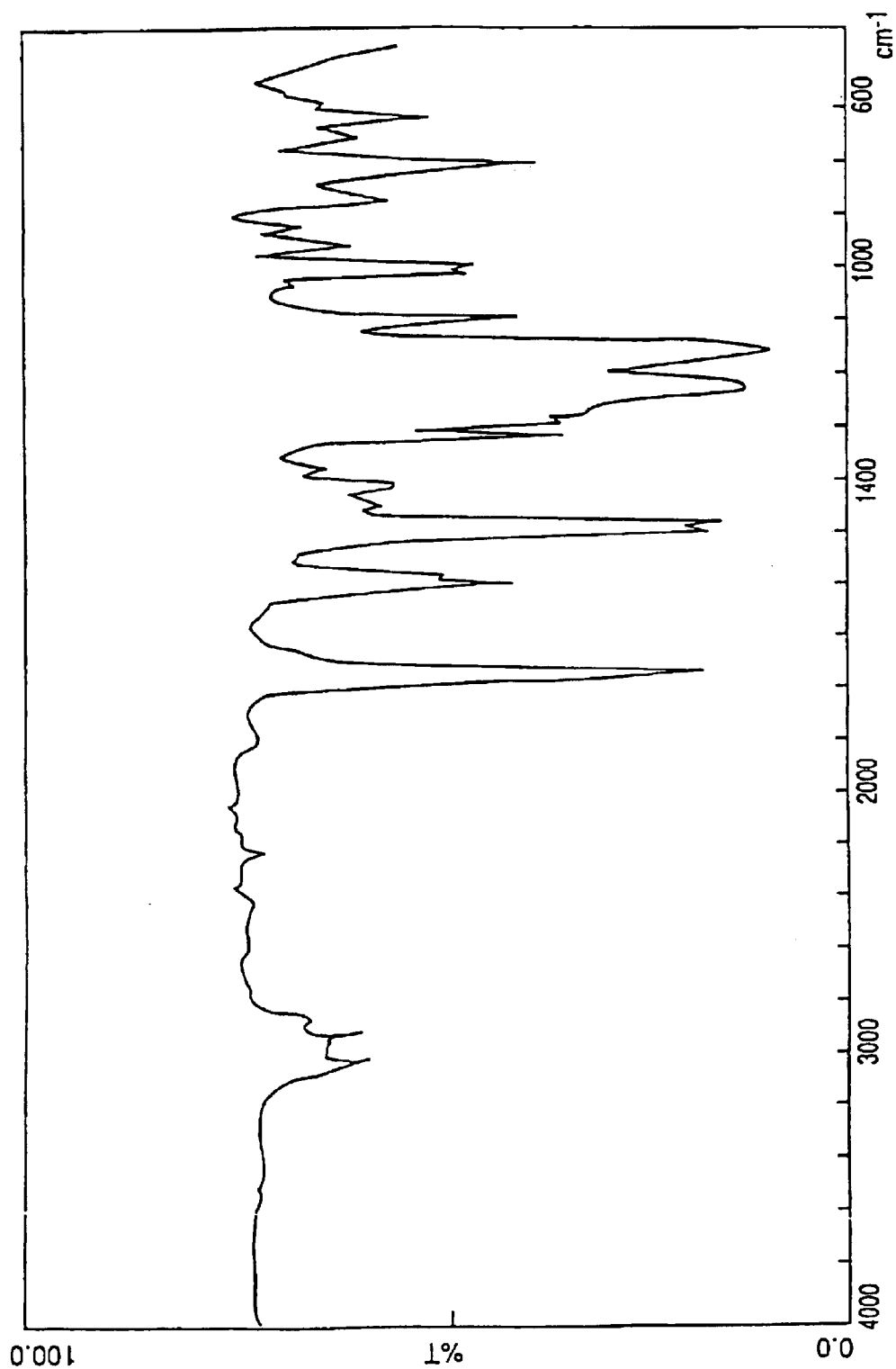

FIG. 8 shows an infrared spectrum of the aromatic polycarbonate resin No. 2, measured from the cast film on an NaCl plate. The IR spectrum of the aromatic polycarbonate resin No. 2 indicates the appearance of the characteristic absorption peak due to C=O stretching vibration of carbonate at 1775 $cm^{-1}$.

The glass transition temperature (Tg) of the above obtained aromatic polycarbonate resin No. 2 was 157.3° C. when measured by use of a differential scanning calorimeter.

The results of the elemental analysis were as follows:

|  | % C | % H | % N |
|---|---|---|---|
| Found | 77.92 | 4.94 | 1.37 |
| Calculated | 77.98 | 5.06 | 1.33 |

The found values were substantially the same as those obtained by calculation from the structural formula.

EXAMPLE 1-3
[Synthesis of Aromatic Polycarbonate Resin No. 3]

2.15 parts of a diol with charge transporting properties, that is, N-{4-[2,2-bis(4-hydroxyphenyl)vinyl]phenyl}-N,N-bis(4-tolyl)amine, 1.57 parts of a diol serving as a comonomer, that is, 4,4'-dihydroxy-2,2'3,3'-tetramethyldiphenylether, and 0.013 parts of a molecular weight modifier, that is, 4-tert-butyl phenol were placed in a reaction container with stirrer.

The above prepared reaction mixture was dissolved with stirring in a stream of nitrogen, with the addition thereto of an aqueous solution prepared by dissolving 3.16 parts of sodium hydroxide and 0.1 parts of sodium hydrosulfite in 42 parts of water.

Thereafter, the reaction mixture was cooled to 20° C., and vigorously stirred with the addition thereto of a solution prepared by dissolving 1.88 parts of bis(trichloromethyl) carbonate, namely, a trimer of phosgene, in 28 parts of dichloromethane, thereby forming an emulsion. The polymerization reaction was carried out with the emulsion being formed.

The reaction mixture was then stirred for 15 minutes at room temperature. With the addition of 0.01 parts of triethylamine serving as a catalyst, the reaction mixture was further stirred for 120 minutes at room temperature to continue the reaction.

Thereafter, by the addition of 200 parts of dichloromethane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a yellow polycarbonate resin was precipitated. Thus, 3.89 parts of a polycarbonate resin No. 3 (in the form of a random copolymer) according to the present invention were obtained.

The structural units of the polycarbonate resin No. 3 are shown below, and the composition ratio of each structural unit is put beside the structural unit, on the supposition that the total number of structural units is 1.

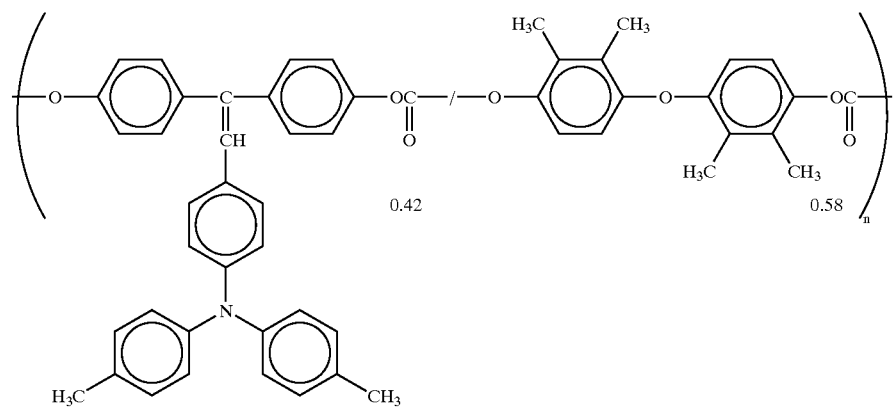

The polystyrene-reduced number-average molecular weight (Mn) and weight-average molecular weight (Mw), which were measured by gel permeation chromatography, were respectively 66,200 and 210,600.

Figure 9:
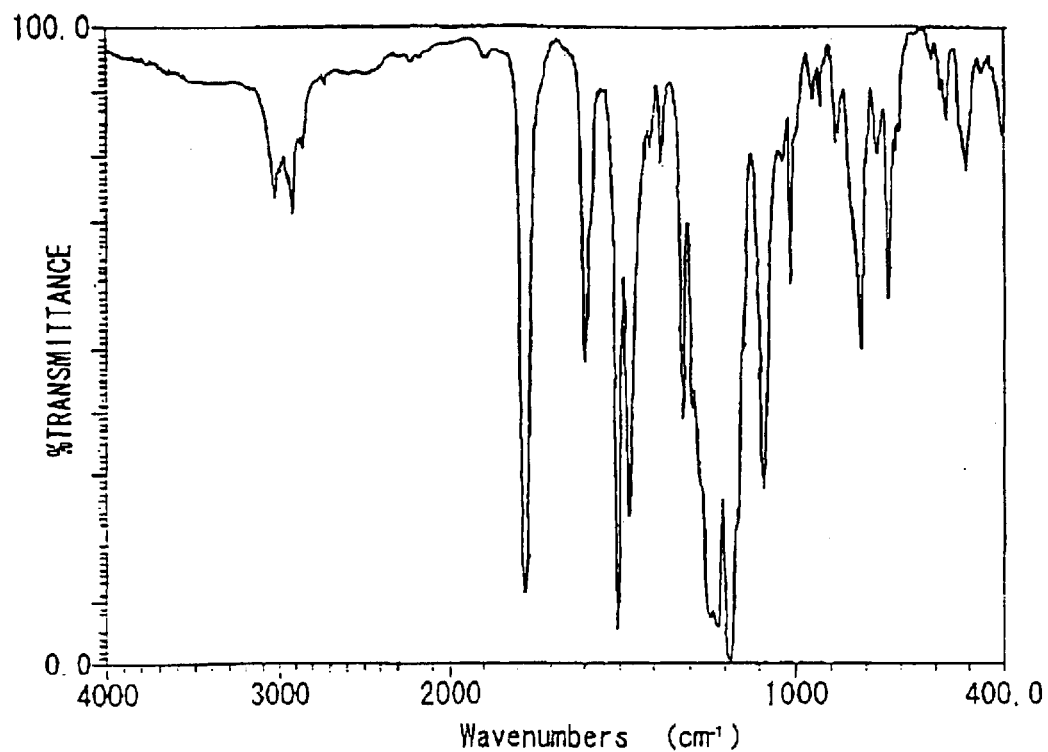

FIG. 9 shows an infrared spectrum of the aromatic polycarbonate resin No. 3, measured from the cast film on an NaCl plate. The IR spectrum indicates the appearance of the characteristic absorption peak due to C=O stretching vibration of carbonate at 1780 $cm^{-1}$.

The glass transition temperature (Tg) of the above obtained aromatic polycarbonate resin No. 3 was 169.6° C. when measured by use of a differential scanning calorimeter.

The results of the elemental analysis were as follows:

|  | % C | % H | % N |
|---|---|---|---|
| Found | 77.91 | 5.43 | 1.36 |
| Calculated | 77.87 | 5.48 | 1.56 |

The found values were substantially the same as those obtained by calculation from the structural formula.

EXAMPLE 1-4
[Synthesis of Aromatic Polycarbonate Resin No. 4]

2.15 parts of a diol with charge transporting properties, that is, N-{4-[2,2-bis(4-hydroxyphenyl)vinyl]phenyl}-N,N-bis(4-tolyl)amine, 1.57 parts of a diol serving as a comonomer, that is, 4,4'-dihydroxy-2,2'5,5'-tetramethyldiphenylether, and 0.013 parts of a molecular weight modifier, that is, 4-tert-butyl phenol were placed in a reaction container with stirrer.

The above prepared reaction mixture was dissolved with stirring in a stream of nitrogen, with the addition thereto of an aqueous solution prepared by dissolving 3.16 parts of sodium hydroxide and 0.1 parts of sodium hydrosulfite in 42 parts of water.

Thereafter, the reaction mixture was cooled to 20° C., and vigorously stirred with the addition thereto of a solution prepared by dissolving 1.88 parts of bis(trichloromethyl) carbonate, namely, a trimer of phosgene, in 28 parts of dichloromethane, thereby forming an emulsion. The polymerization reaction was carried out with the emulsion being formed.

The reaction mixture was then stirred for 15 minutes at room temperature. With the addition of 0.01 parts of triethylamine serving as a catalyst, the reaction mixture was further stirred for 120 minutes at room temperature to continue the reaction.

Thereafter, by the addition of 200 parts of dichloromethane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a yellow polycarbonate resin was precipitated. Thus, 3.91 parts of a polycarbonate resin No. 4 (in the form of a random copolymer) according to the present invention were obtained.

The structural units of the polycarbonate resin No. 4 are shown below, and the composition ratio of each structural unit is put beside the structural unit, on the supposition that the total number of structural units is The polystyrene-reduced number-average molecular weight (Mn) and weight-average molecular weight (Mw), which were measured by gel permeation chromatography, were respectively 46,300 and 127,100.

Figure 10:
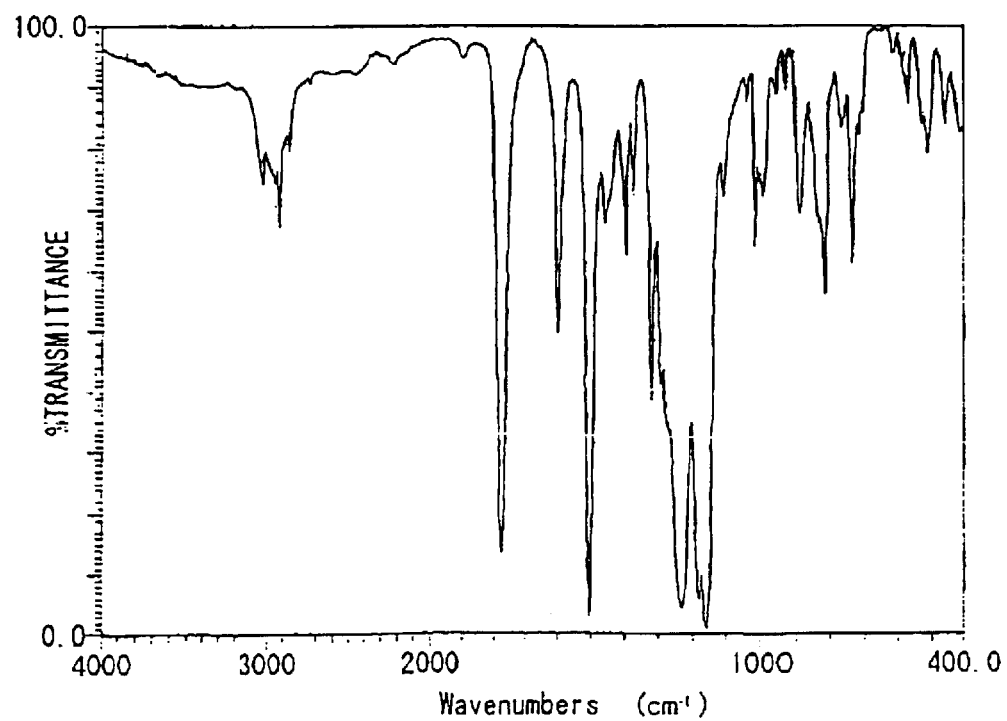

FIG. 10 shows an infrared spectrum of the aromatic polycarbonate resin No. 4, measured from the cast film on an NaCl plate. The IR spectrum indicates the appearance of the characteristic absorption peak due to C=O stretching vibration of carbonate at 1780 cm$^{-1}$.

The glass transition temperature (Tg) of the above obtained aromatic polycarbonate resin No. 4 was 166.9° C. when measured by use of a differential scanning calorimeter.

The results of the elemental analysis were as follows:

|  | % C | % H | % N |
|---|---|---|---|
| Found | 77.98 | 5.39 | 1.46 |
| Calculated | 77.87 | 5.48 | 1.56 |

The found values were substantially the same as those obtained by calculation from the structural formula.

EXAMPLE 2-1
[Fabrication of Electrophotographic Photoconductor No. 1]
(Formation of Undercoat Layer)

A commercially available polyamide resin (Trademark "CM-8000", made by Toray Industries, Inc.) was dissolved in a mixed solvent of methanol and butanol, so that a coating liquid for undercoat layer was prepared. The thus prepared coating liquid was coated on an aluminum plate by a doctor blade, and dried at room temperature, so that an undercoat layer with a thickness of 0.3 μm was provided on the aluminum plate.

(Formation of Charge Generation Layer)

A coating liquid for charge generation layer was prepared by pulverizing and dispersing a bisazo compound of the following formula, serving as a charge generation material, in a mixed solvent of cyclohexanone and methyl ethyl ketone using a ball mill. The thus obtained coating liquid was coated on the above prepared undercoat layer by a doctor blade, and dried at room temperature. Thus, a charge

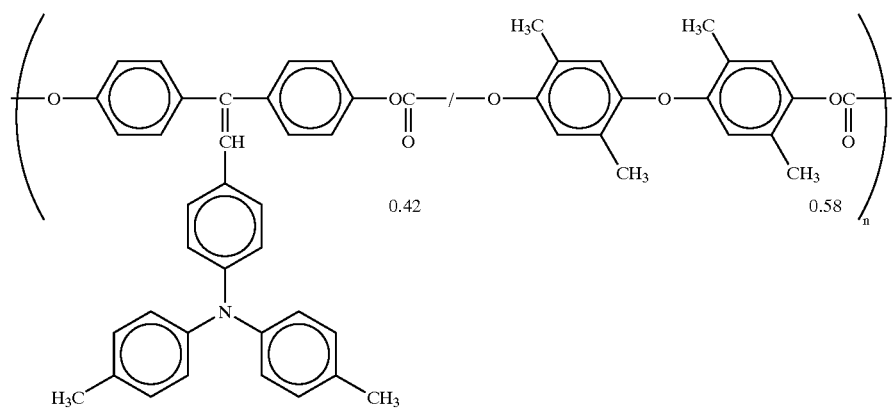

generation layer with a thickness of about 0.5 μm was formed on the undercoat layer.

[Bisazo compound]

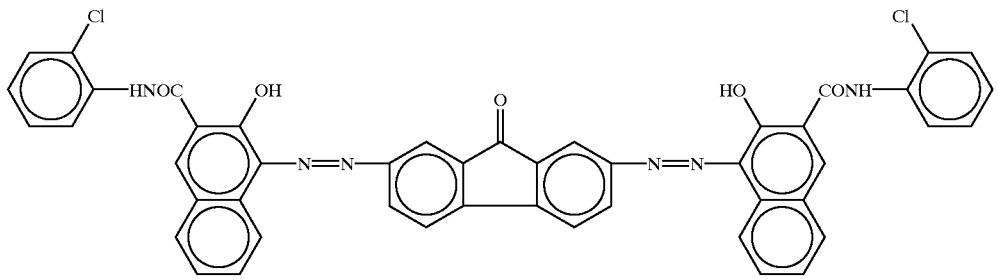

(Formation of Charge Transport Layer)

The aromatic polycarbonate resin No. 1 prepared in Example 1-1, serving as a charge transport material, was dissolved in dichloromethane. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 1 according to the present invention was fabricated.

EXAMPLES 2-2 to 2-4

The procedure for fabrication of the electrophotographic photoconductor No. 1 in Example 2-1 was repeated except that the aromatic polycarbonate resin No. 1 for use in the charge transport layer coating liquid in Example 2-1 was replaced by the aromatic polycarbonate resins No. 2, No. 3, and No. 4, respectively in Examples 2-2, 2-3, and 2-4.

Thus, electrophotographic photoconductors No. 2, No. 3, and No. 4 according to the present invention were fabricated.

Each of the electrophotographic photoconductors No. 1 to No. 4 according to the present invention fabricated in Examples 2-1 to 2-4 was charged negatively in the dark under application of –6 kV of corona charge for 20 seconds, using a commercially available electrostatic copying sheet testing apparatus ("Paper Analyzer Model SP-428" made by Kawaguchi Electro Works Co., Ltd.). The surface potential (Vm) of each photoconductor was measured.

Then, each electrophotographic photoconductor was allowed to stand in the dark for 20 seconds without applying any charge thereto, and the surface potential (Vo) of the photoconductor was measured.

Each photoconductor was then illuminated by a tungsten lamp in such a manner that the illuminance on the illuminated surface of the photoconductor was 4.5 lux, and the exposure $E_{1/2}$ (lux.sec) required to reduce the initial surface potential Vo (V) to ½ the initial surface potential Vo (V) was measured.

The results are shown in TABLE 1.

TABLE 1

| Example No. | Polycarbonate Resin No. | Vm (V) | Vo (V) | $E_{1/2}$ (lux · sec) |
|---|---|---|---|---|
| 2-1 | No. 1 | –1316 | –1194 | 1.23 |
| 2-2 | No. 2 | –1447 | –1320 | 1.38 |
| 2-3 | No. 3 | –1519 | –1408 | 1.53 |
| 2-4 | No. 4 | –1566 | –1461 | 1.61 |

Comparative Example 1

The procedure for fabrication of the electrophoto-graphic photoconductor No. 1 in Example 2-1 was repeated except that the aromatic polycarbonate resin No. 1 for use in the charge transport layer coating liquid in Example 2-1 was replaced by an aromatic polycarbonate resin with a weight-average molecular weight of 126,000 and a number-average molecular weight of 55,700, represented by the following formula.

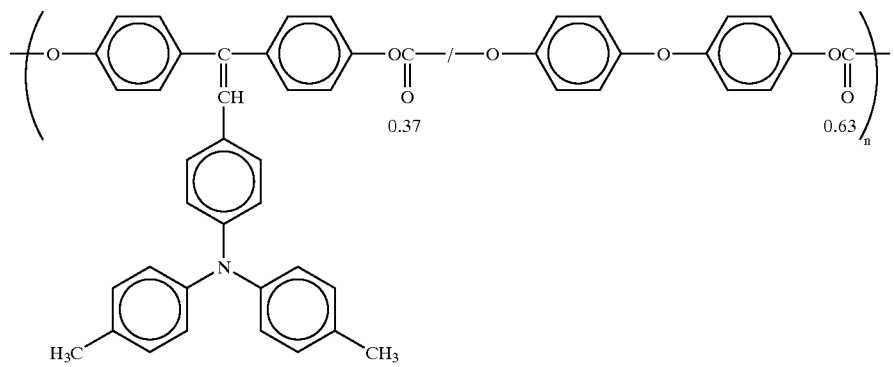

Thus, a comparative electrophotographic photoconductor No. 1 was fabricated.

Comparative Example 2

The procedure for fabrication of the electrophoto-graphic photoconductor No. 1 in Example 2-1 was repeated except that the aromatic polycarbonate resin No. 1 for use in the charge transport layer coating liquid in Example 2-1 was replaced by an aromatic polycarbonate resin with a weight-average molecular weight of 207,900 and a number-average molecular weight of 83,600, represented by the following formula.

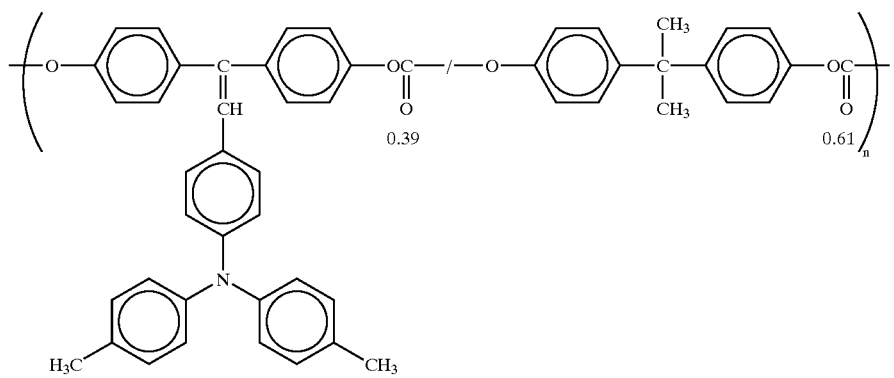

Thus, a comparative electrophotographic photoconductor No. 2 was fabricated.

The electrophotographic photoconductors Nos. 1 to 4 according to the present invention fabricated in Examples 2-1 to 2-4 and the comparative electrophotographic photoconductors Nos. 1 and 2 fabricated in Comparative Examples 1 and 2 were subjected to an abrasion test in accordance with JIS K 7204(1995), using a commercially available Taber abrader with truck wheels (CS-5), made by Toyo Seiki Seisaku-sho, Ltd.

The abrasion amount of each photoconductor was measured under the application of a load of 1 kg after 3000 rotations.

The results are shown in TABLE 2.

TABLE 2

| Example No. | Abrasion Amount (mg) |
|---|---|
| Example 2-1 | 0.61 |
| Example 2-2 | 0.54 |
| Example 2-3 | 1.13 |
| Example 2-4 | 0.94 |
| Comparative Example 1 | 2.02 |
| Comparative Example 2 | 4.30 |

As is apparent from the results shown in TABLE 2, the abrasion resistance of the photoconductor according to the present invention is considered to be superior to that of the conventional photoconductor employing the high-molecular charge transport materials. Consequently, the photoconductors of the present invention show high durability in terms of the abrasion resistance.

EXAMPLE 2-5

[Fabrication of Electrophotographic Photoconductor No. 5]

(Formation of Undercoat Layer)

A coating liquid with the following formulation was coated on the outer surface of an aluminum drum with a diameter of 30 mm, and dried. Thus, an undercoat layer with a thickness of 3.5 μm was provided on the aluminum drum.

| | Parts by Weight |
|---|---|
| Alkyd resin (Trademark "Beckosol 1307-60-EL", made by Dainippon Ink & Chemicals, Incorporated) | 6 |
| Melamine resin (Trademark "Super Beckamine G-821-60", made by Dainippon Ink & Chemicals, Incorporated) | 4 |
| Titanium oxide | 40 |
| Methyl ethyl ketone | 50 |

[Formation of charge generation layer]

A coating liquid with the following formulation was coated on the above prepared undercoat layer, and dried. Thus, a charge generation layer with a thickness of 0.2 μm was provided on the undercoat layer.

| | |
|---|---|
| Oxotitanium phthalocyanine pigment (charge generation material) | 3 |
| Poly(vinyl butyral) (Trademark "XYHL", made by Union Carbide Japan K.K.) | 2 |
| Tetrahydrofuran | 95 |

[Formation of charge transport layer]

A coating liquid with the following formulation was coated on the above prepared charge generation layer, and dried. Thus, a charge transport layer with a thickness of 30 ±1 μm was provided on the charge generation layer.

| | |
|---|---|
| Polycarbonate resin No. 1 (prepared in Example 1-1) | 10 |
| Methylene chloride | 90 |

Thus, an electrophotographic photoconductor No. 5 according to the present invention was fabricated.

EXAMPLES 2-6 to 2-8

The procedure for fabrication of the electrophotographic photoconductor No. 5 in Example 2-5 was repeated except that the aromatic polycarbonate resin No. 1 for use in the charge transport layer coating liquid in Example 2-5 was replaced by the aromatic polycarbonate resins No. 2, No. 3, and No. 4, respectively in Examples 2-6, 2-7, and 2-8.

Thus, electrophotographic photoconductors No. 6, No. 7, and No. 8 according to the present invention were fabricated.

Comparative Example 3

The procedure for fabrication of the electrophotographic photoconductor No. 5 in Example 2-5 was repeated except that the formulation for the charge transport layer coating liquid in Example 2-5 was changed to the following formulation:

| | Parts by Weight |
|---|---|
| Bisphenol Z type polycarbonate (Trademark "PCX-5", made by Teijin Chemicals Ltd.) | 10 |
| Low-molecular charge transport material with the following formula: | 7 |

| | Parts by Weight |
|---|---|
| Methylene chloride | 150 |

Thus, a comparative electrophotographic photoconductor No. 3 was fabricated.

Then, each of the electrophotographic photoconductors Nos. 5 to 8 according to the present invention and the comparative electrophotographic photoconductor No. 3 was set in a commercially available copying machine "imagio MF200" (Trademark), made by Ricoh Company, Ltd., which was partially modified to have such a structure as shown in FIG. 11. A copying test was continuously carried out for 40 hours. The difference between the thickness of the photoconductive layer before the copying test and the thickness after the copying test was measured as the abrasion wear ($\mu$m). The results are shown in TABLE 3.

TABLE 3

| Example No. | Abrasion Wear ($\mu$m) |
|---|---|
| Example 2-5 | 2.11 |
| Example 2-6 | 1.89 |
| Example 2-7 | 1.42 |
| Example 2-8 | 1.58 |
| Comparative Example 3 | 4.00 |

The results of TABLE 3 show that the abrasion resistance of the electrophotographic photoconductor according to the present invention is excellent.

Further, each of the electrophotographic photoconductors according to the present invention was set in a commercially available electrophotographic copying machine, and the photoconductor was charged and exposed to light images via original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

EXAMPLE 2-9

[Fabrication of Electrophotographic Photoconductor No. 9]
(Formation of Undercoat Layer)

A coating liquid with the following formulation was coated on the surface of an electromolded nickel belt, and dried. Thus, an undercoat layer with a thickness of about 6 $\mu$m was provided on the nickel belt.

| | Parts by Weight |
|---|---|
| Titanium oxide (TA-300) | 5 |
| Copolymer polyamide resin (Trademark "CM-8000", made by Toray Industries, Inc.) | 4 |
| Methanol | 50 |
| Isopropanol | 20 |

[Formation of charge generation layer]
A coating liquid with the following formulation was coated on the above prepared undercoat layer, and dried. Thus, a charge generation layer with a thickness of about 0.3 $\mu$m was provided on the undercoat layer.

| | |
|---|---|
| y-type oxotitanium phthalocyanine pigment particles (charge generation material) | 4 |
| Poly(vinyl butyral) | 2 |
| Cyclohexanone | 50 |
| Tetrahydrofuran | 100 |

[Formation of charge transport layer]
A coating liquid with the following formulation was coated on the above prepared charge generation layer, and dried. Thus, a charge transport layer with a thickness of 24 $\mu$m was provided on the charge generation layer.

| | |
|---|---|
| Polycarbonate resin No. 1 (prepared in Example 1-1) | 10 |
| Tetrahydrofuran | 60 |

Thus, an electrophotographic photoconductor No. 9 according to the present invention was fabricated.

EXAMPLES 2-10 to 2-12

The procedure for fabrication of the electrophotographic photoconductor No. 9 in Example 2-9 was repeated except that the aromatic polycarbonate resin No. 1 for use in the charge transport layer coating liquid in Example 2-9 was replaced by the aromatic polycarbonate resins No. 2, No. 3, and No. 4, respectively in Examples 2-10, 2-11, and 2-12.

Thus, electrophotographic photoconductors No. 10, No. 11, and No. 12 according to the present invention were fabricated.

Each of the electrophotographic photoconductors No. 9 to No. 12 according to the present invention was incorporated in the same electrophotographic image forming apparatus as shown in FIG. 12 except that the pre-cleaning light 26 was omitted. Using a semiconductor laser beam of 780 nm as the image exposure light 24, light images were written through a polygon mirror. A probe of a potentiometer was put into the photoconductor to measure the surface potential of the photoconductor immediately before development was conducted. The surface potentials of a non-light exposed portion and a light-exposed portion were measured at the initial stage and after making of 10,000 copies. The results are shown in TABLE 4.

TABLE 4

| Example No. | Polycarbonate Resin No. | At Initial Stage | | After Making of 10,000 Copies | |
|---|---|---|---|---|---|
| | | Surface potetial of non-light exposed portion (V) | Surface potential of light-exposed portion (V) | Surface potential of non-light exposed portion (V) | Surface potential of light-exposed portion (V) |
| 2-9 | 1 | −855 | −35 | −845 | −51 |
| 2-10 | 2 | −845 | −45 | −826 | −49 |
| 2-11 | 3 | −829 | −55 | −808 | −60 |
| 2-12 | 4 | −835 | −42 | −822 | −56 |

EXAMPLE 2-13

An aluminum cylinder serving as an electroconductive support was surface-treated by anodizing, followed by sealing.

On the outer surface of the thus prepared aluminum cylinder, a charge generation layer and a charge transport layer were successively overlaid in the same manner as in Example 2-9. Thus, an electrophotographic photoconductor No. 13 according to the present invention was fabricated.

EXAMPLES 2-14 to 2-16

The procedure for fabrication of the electrophotographic photoconductor No. 13 in Example 2-13 was repeated except that the aromatic polycarbonate resin No. 1 for use in the charge transport layer coating liquid in Example 2-13 was replaced by the aromatic polycarbonate resins No. 2, No. 3, and No. 4, respectively in Examples 2-14, 2-15, and 2-16.

Thus, electrophotographic photoconductors No. 14, No. 15, and No. 16 according to the present invention were fabricated.

Each of the electrophotographic photoconductors No. 13 to No. 16 according to the present invention was incorporated in the electrophotographic process cartridge as shown in FIG. 13, and the process cartridge was set in the electrophotographic image forming apparatus. Using a semiconductor laser beam of 780 nm as the light source for image exposure, light images were written through a polygon mirror. A probe of a potentiometer was put into the photoconductor to measure the surface potential of the photoconductor immediately before development was conducted. The surface potentials of a non-light exposed portion and a light-exposed portion were measured at the initial stage and after making of 5,000 copies. The results are shown in TABLE 5.

TABLE 5

| Example No. | Polycarbonate Resin No. | At Initial Stage | | After Making of 5,000 Copies | |
|---|---|---|---|---|---|
| | | Surface potetial of non-light exposed portion (V) | Surface potential of light-exposed portion (V) | Surface potential of non-light exposed portion (V) | Surface potential of light-exposed portion (V) |
| 2-13 | 1 | −834 | −55 | −837 | −61 |
| 2-14 | 2 | −842 | −62 | −815 | −68 |
| 2-15 | 3 | −855 | −58 | −829 | −64 |
| 2-16 | 4 | −848 | −64 | −838 | −69 |

As can be seen from the results shown in TABLE 4 and TABLE 5, the surface potential of the electrophotographic photoconductor of the present invention can be maintained stable after repeated use.

As previously explained, the polycarbonate resins of the present invention, for example, comprising the structural unit of formula (2) can provide polymeric materials with minimum mechanical abrasion. In addition, these polycarbonate resins can effectively function as photoconductive materials in the electrophotographic photoconductor. Such polycarbonate resins are optically or chemically sensitized with a sensitizer such as a dye or a Lewis acid. These resin compounds are preferably employed as charge transport materials in a photoconductive layer of the electrophotographic photoconductor, in particular, of a function-separating electrophotographic photoconductor comprising a charge generation layer and a charge transport layer because these polycarbonate resins are provided with high charge transporting properties and high mechanical strength.

The polycarbonate resin for use in the photoconductive layer of the electrophotographic photoconductor according to the present invention comprises at least the structural unit of formula (2), and a structural unit having charge transporting properties. Furthermore, a polycarbonate resin in the form of a random copolymer comprising the structural unit of formula (2) and the structural unit of formula (1') or (1), and a polycarbonate resin in the form of an alternating copolymer comprising the repeat unit of formula (3') or (3) are employed in the electrophotographic photoconductors of the present invention.

In any case, the polycarbonate resin for use in the present invention comprises at least the structural unit of formula (2), so that a polymeric material with minimum mechanical abrasion can be provided. When the above-mentioned polycarbonate resin is employed in the photoconductive layer of the electrophotographic photoconductor, the abrasion resistance of the photoconductor is remarkably improved. Further, the polycarbonate resin comprising the structural unit of formula (2) and the structural unit having charge transporting properties has excellent mechanical strength and sufficient charge transporting properties, so that the obtained photoconductor can exhibit high sensitivity and high durability.

Japanese Patent Applications Nos. 11-191652 and 11-191667 filed on Jul. 6, 1999 are hereby incorporated by reference.

What is claimed is:
1. An electrophotographic photoconductor, comprising:
an electroconductive support, and
a photoconductive layer formed thereon comprising as an effective component an aromatic polycarbonate resin consisting essentially of a structural unit of formula (2) and a structural unit with charge transporting properties,
wherein an amount of said structural unit of formula (2) is 58 to 60 mole percent and an amount of said charge transporting unit is 40 to 42 mole percent based on said polycarbonate resin:

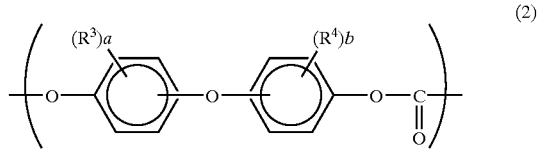

(2)

wherein a and b are each independently an integer of 1 to 4; and $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^3$ and $R^4$ may each be the same or different when a and b are each an integer of 2, 3 or 4;

wherein said structural unit with charge transporting properties is represented by formula (1'):

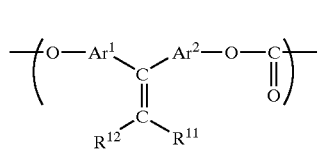
(1')

wherein $R^{11}$ is a hydrogen atom, an alkyl group which may have a substituent, or an aryl group which may have a substituent; $Ar^1$ and $Ar^2$ are each an arylene group which may have a substituent; and $R^{12}$ is an aryl group which may have a substituent.

2. An electrophotographic image forming apparatus comprising:

an electrophotographic photoconductor capable of forming a latent electrostatic image thereon, charging means for charging the surface of said photoconductor, light exposure means for exposing the charged surface of said photoconductor to a light image corresponding to an original image to be reproduced, thereby forming a latent electrostatic image on said photoconductor, development means for developing said latent electrostatic image to a visible image, image transfer means for transferring said visible image to an image receiving member, cleaning means for cleaning the surface of said photoconductor, and quenching means for quenching the residual potential on the surface of said photoconductor, wherein said electrophotographic photoconductor comprises an electroconductive support, and a photoconductive layer formed thereon comprising as an effective component an aromatic polycarbonate resin consisting essentially of a structural unit of formula (2) and a structural unit with charge transporting properties, wherein an amount of said structural unit of formula (2) is 58 to 60 mole percent and an amount of said charge transporting unit is 40 to 42 mole percent based on said polycarbonate resin:

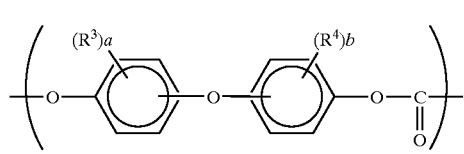
(2)

wherein a and b are each independently an integer of 1 to 4; and $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^3$ and $R^4$ may each be the same or different when a and b are each an integer of 2, 3 or 4;

wherein said structural unit with charge transporting properties is represented by formula (1')

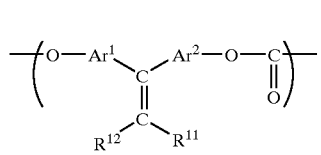
(1')

wherein $R^{11}$ is a hydrogen atom, an alkyl group which may have a substituent, or an aryl group which may have a substituent; $Ar^1$ and $Ar^2$ are each an arylene group which may have a substituent; and $R^{12}$ is an aryl group which may have a substituent.

3. An electrophotographic process cartridge, comprising:

an electrophotographic photoconductor capable of forming a latent electrostatic image thereon, and at least one of a charging unit, a light exposing unit, a development unit, an image transfer unit, a cleaning unit, or a quenching unit, wherein said photoconductor comprises an electroconductive support, and a photoconductive layer formed thereon comprising as an effective component an aromatic polycarbonate resin consisting essentially of a structural unit of formula (2) and a structural unit with charge transporting properties, wherein an amount of said structural unit of formula (2) is 58 to 60 mole percent and an amount of said charge transporting unit is 40 to 42 mole percent based on said polycarbonate resin:

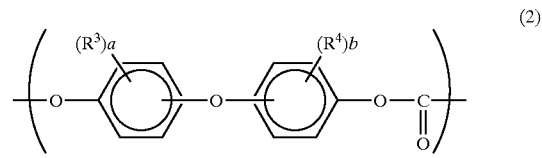
(2)

wherein a and b are each independently an integer of 1 to 4; and $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^3$ and $R^4$ may each be the same or different when a and b are each an integer of 2, 3 or 4;

wherein said structural unit with charge transporting properties is represented by formula (1'):

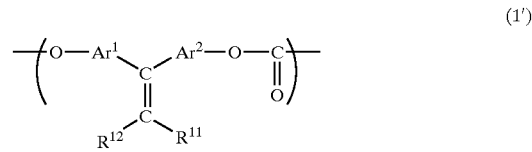
(1')

wherein $R^{11}$ is a hydrogen atom, an alkyl group which may have a substituent, or an aryl grow, which may have a substituent; $Ar^1$ and $Ar^2$ are each an arylene group which may have a substituent; and $R^{12}$ is an aryl group which may have a substituent.

4. An electrophotographic photoconductor, comprising:

an electroconductive support, and a photoconductive layer formed thereon comprising as an effective component an aromatic polycarbonate resin consisting essentially of a structural unit of formula (2) and a structural unit with charge transporting properties, wherein an amount of said structural unit of formula (2) is 58 to 60 mole percent and an amount of said charge transporting unit is 40 to 42 mole percent based on said polycarbonate resin:

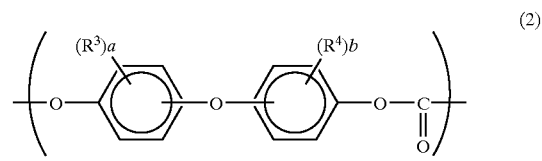
(2)

wherein a and b are each independently an integer of 1 to 4; and $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^3$ and $R^4$ may each be the same or different when a and b are each an integer of 2, 3 or 4;

wherein said structural unit with charge transporting properties is represented by formula (1):

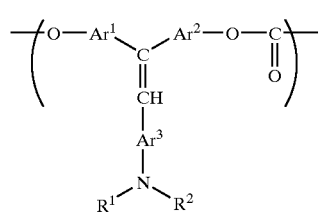

(1)

wherein $R^1$ and $R^2$, which may be the same or different, are each an acyl group, an alkyl group having 1 to 6 carbon atoms which may have a substituent, or an aryl group which may have a substituent; and $Ar^1$, $Ar^2$, and $Ar^3$ are each a substituted or unsubstituted arylene group.

5. An electrophotographic image forming apparatus, comprising:

an electrophotographic photoconductor capable of forming a latent electrostatic image thereon, charging means for charging the surface of said photoconductor, light exposure means for exposing the charged surface of said photoconductor to a light image corresponding to an original image to be reproduced, thereby forming a latent electrostatic image on said photoconductor, development means for developing said latent electrostatic image to a visible image, image transfer means for transferring said visible image to an image receiving member, cleaning means for cleaning the surface of said photoconductor, and quenching means for quenching the residual potential on the surface of said photoconductor, wherein said electrophotographic photoconductor comprises an electroconductive support, and a photoconductive layer formed thereon comprising as an effective component an aromatic polycarbonate resin consisting essentially of a structural unit of formula (2) and a structural unit with charge transporting properties, wherein an amount of said structural unit of formula (2) is 58 to 60 mole percent and an amount of said charge transporting unit is 40 to 42 mole percent based on said polycarbonate resin:

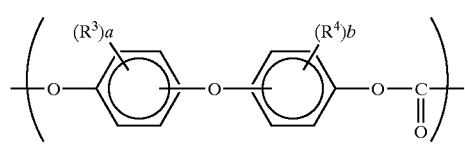

(2)

wherein a and b are each independently an integer of 1 to 4; and $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^3$ and $R^4$ may each be the same or different when a and b are each an integer of 2, 3 or 4;

wherein said structural unit with charge transporting properties is represented by formula (1):

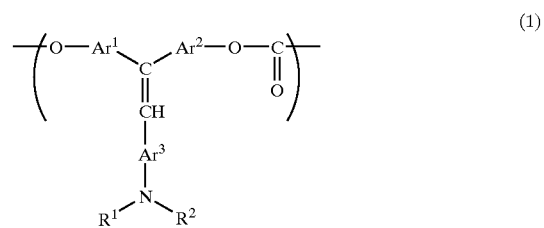

(1)

wherein $R^1$ and $R^2$, which may be the same or different, are each an acyl group, an alkyl group having 1 to 6 carbon atoms which may have a substituent, or an aryl group which may have a substituent; and $Ar^1$, $Ar^2$, and $A^3$ are each a substituted or unsubstituted arylene group.

6. An electrophotographic process cartridge, comprising:

an electrophotographic photoconductor capable of forming a latent electrostatic image thereon, and at least one of a charging unit, a light exposing unit, a development unit, an image transfer unit, a cleaning unit, or a quenching unit, wherein said photoconductor comprises an electroconductive support, and a photoconductive layer formed thereon comprising as an effective component an aromatic polycarbonate resin consisting essentially of a structural unit of formula (2) and a structural unit with charge transporting properties, wherein an amount of said structural unit of formula (2) is 58 to 60 mole percent and an amount of said charge transporting unit is 40 to 42 mole percent based on said polycarbonate resin:

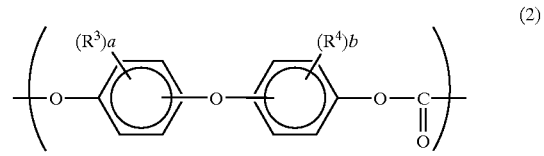

(2)

wherein a and b are each independently an integer of 1 to 4; and $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^3$ and $R^4$ may each be the same or different when a and b are each an integer of 2, 3 or 4;

wherein said structural unit with charge transporting properties is represented by formula (1):

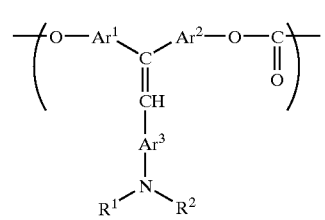

(1)

wherein $R^1$ and $R^2$, which may be the same or different, are each an acyl group, an alkyl group having 1 to 6 carbon atoms which may have a substituent, or an aryl group which may have a substituent; and $Ar^1$, $Ar^2$, and $Ar^3$ are each a substituted or unsubstituted arylene group.

* * * * *